Jan. 20, 1953 N. B. COLEY 2,626,314

CODE COMMUNICATION SYSTEM

Filed Aug. 3, 1951 9 Sheets-Sheet 1

Inventor

N.B.Coley

By Neil W. Preston

His Attorney

Jan. 20, 1953 N. B. COLEY 2,626,314

CODE COMMUNICATION SYSTEM

Filed Aug. 3, 1951 9 Sheets-Sheet 2

Inventor

N. B. Coley

By Neil H. Preston

His Attorney

Jan. 20, 1953 N. B. COLEY 2,626,314

CODE COMMUNICATION SYSTEM

Filed Aug. 3, 1951 9 Sheets-Sheet 3

Inventor

N.B.Coley

By

Neil D. Preston,
His Attorney

Inventor
N. B. Coley
By Neil M. Preston
His Attorney

Inventor
N. B. Coley
By Neil W. Preston,
His Attorney

CONTROL OFFICE TRANSMISSION

FIELD STATION RECEPTION

SOLID BAR REPRESENTS ENERGIZATION
COMMUNICATION OF SWITCH CYCLE CODE
"MARK-MARK-MARK-MARK-SPACE-SPACE-MARK"

Inventor
N. B. Coley
By
Neil M. Preston,
His Attorney

FIELD STATION TRANSMISSION

CONTROL OFFICE RECEPTION

Inventor
N. B. Coley
By Neil D. Preston
His Attorney

Inventor
N. B. Coley
By Neil D. Preston,
His Attorney

Jan. 20, 1953 N. B. COLEY 2,626,314

CODE COMMUNICATION SYSTEM

Filed Aug. 3, 1951 9 Sheets-Sheet 9

Inventor
N. B. Coley
By Neil A. Preston,
His Attorney

Patented Jan. 20, 1953

2,626,314

UNITED STATES PATENT OFFICE 2,626,314

CODE COMMUNICATION SYSTEM

Nelson B. Coley, Rochester, N. Y., assignor to General Railway Signal Company, Rochester, N. Y.

Application August 3, 1951, Serial No. 240,086

15 Claims. (Cl. 340—163)

This invention relates to code communication systems, and it more particularly pertains to systems for the remote control of railway track switches and signals, and systems for the communication of indications from a railway track layout to a remote control office.

The present invention is to be considered as providing improvements in the code communication system provided by my prior application, Ser. No. 155,720, filed April 13, 1950, and by the prior application of Coley and Albrighton, Ser. No. 207,253, dated January 23, 1951, and no claim is intended to be made herein to that which is disclosed in either of these prior applications.

In the code communication systems disclosed in the above mentioned Coley and Albrighton application, two separate systems of code communication are provided connecting two remotely spaced stations, one of the code communication systems being for the transmission of controls from a control office to a remote field station, and the other of the code communication systems being for the purpose of transmission of indications from the field station to the control office. Such a system is conveniently called a "duplex" system because the communication of controls and indications is by separate and independent apparatus, and therefore there is no problem of interference between the communication of controls and indications when the system calls for the communication of both at substantially the same time.

Without attempting to define the limits or scope of the present invention, the present invention provides for the simplification of the amount of communication system apparatus required by providing "simplex" operation wherein controls and indications are transmitted at different intervals, and the same stepping and timing organization is used at each station for the two types of communication. Thus there is only one timer such as a code oscillator and one stepping relay bank required for transmitting and receiving purposes at the respective control office and field stations. Code communication is effected by the initiation of the system from a state of rest into a cycle of operation during which the code characters are transmitted as selected "mark" and "space" characters, although other types of characters could be used. The stepping rate is determined by suitable normally inactive timing devices such as code oscillators at the respective stations which operate when initiated at a predetermined rate to govern the associated stepping relays. The initiation of the timing device at the transmitting station is in accordance with the designation of a control for transmission or a change in a device to be indicated; and the initiation of the timing device at a receiving station is in accordance with the initial opening of the line circuit.

In case of simultaneous starts of both the office and the field station, the office transmitter is made superior to the field station so as to lock out the field station's start and condition the communication apparatus at the field station for the reception of a control code. The lockout of the field station transmitter is accomplished by use of the first communication channel which is always a mark for transmission from the control office, and is always a space when the field station is transmitting. The reception of this mark as the first character at the field station is effective to change a field station start, which may have been simultaneously effected, into a conditioning for the reception of controls, so that the field station may complete the cycle for the reception of controls, and then initiate a subsequent cycle of operation for the transmission of indications.

The operation of the stepping relay bank at each station during a cycle is such as to cause a partial repeat of the operation of the stepping relays during each control cycle and to cause both the partial repeat and a full repeat to be effected when indications are transmitted so as to form substantially twice the number of indication communication channels as compared to the number of channels formed for the transmission of controls.

An object of the present invention is to reduce to a minimum the amount of apparatus required for code communication of controls from a control office to a field station and for the communication of indications from the field station to the control office.

Another object of the present invention is to provide a simplified interlock between the control office and field station transmitters to make the control office superior in case of simultaneous starts of both transmitters.

Other objects, purposes, and characteristic features of the present invention will be in part obvious from the accompanying drawings, and in part pointed out as the description of the invention progresses.

In describing the invention in detail, reference is made to the accompanying drawings, in which corresponding parts are designated by like reference characters; in which similar parts having similar functions are designated by like letter reference characters generally having preceding numerals indicative of the order of the relay operation and succeeding numerals indicative of designation of a distinctive location or station with which the apparatus is associated; and in which:

Figs. 1A and 1B when placed side by side illustrate the transmitting and receiving apparatus of a code communication system provided according to the present invention for the transmission of switch and signal controls from a control office to a single field location;

Figs. 1C and 1D when placed side by side beneath Figs. 1A and 1B, respectively, illustrate the additional apparatus required at the control office and at the field station for the communication of indications from the field station to the control office;

Figure 7A:
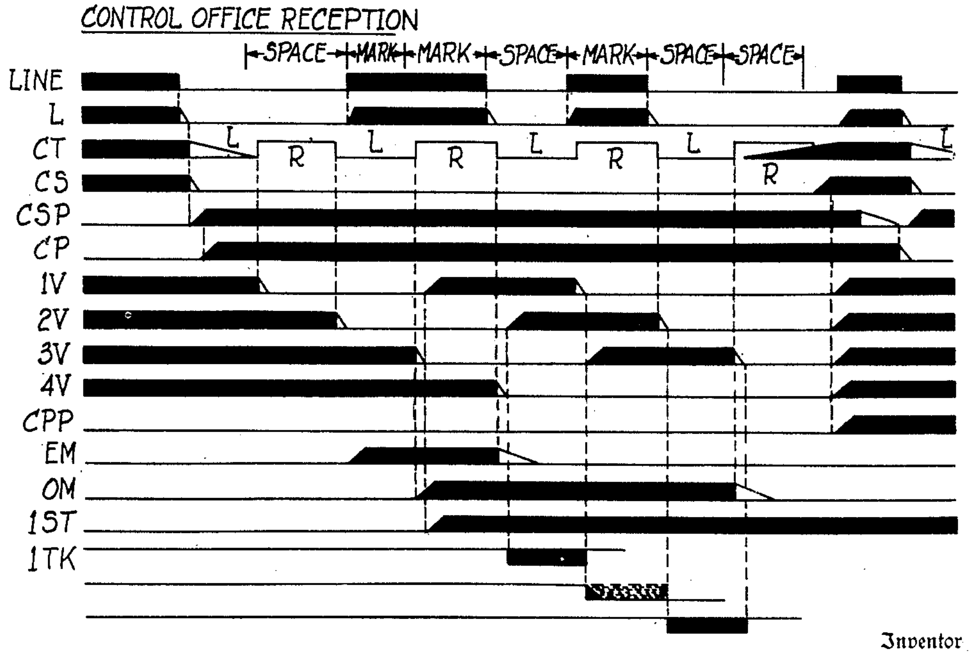
Figure 6B:
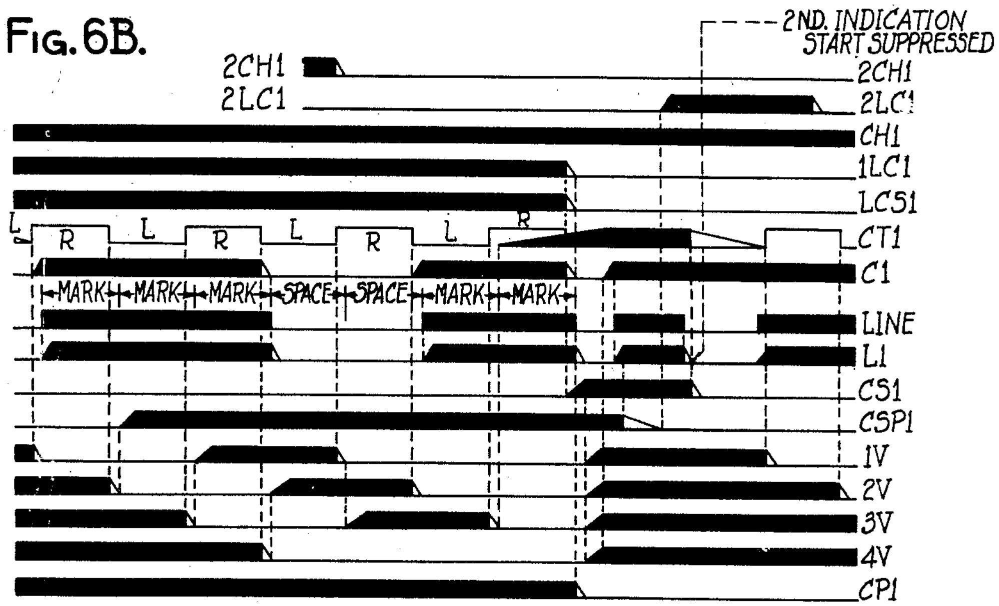
Figure 7B:
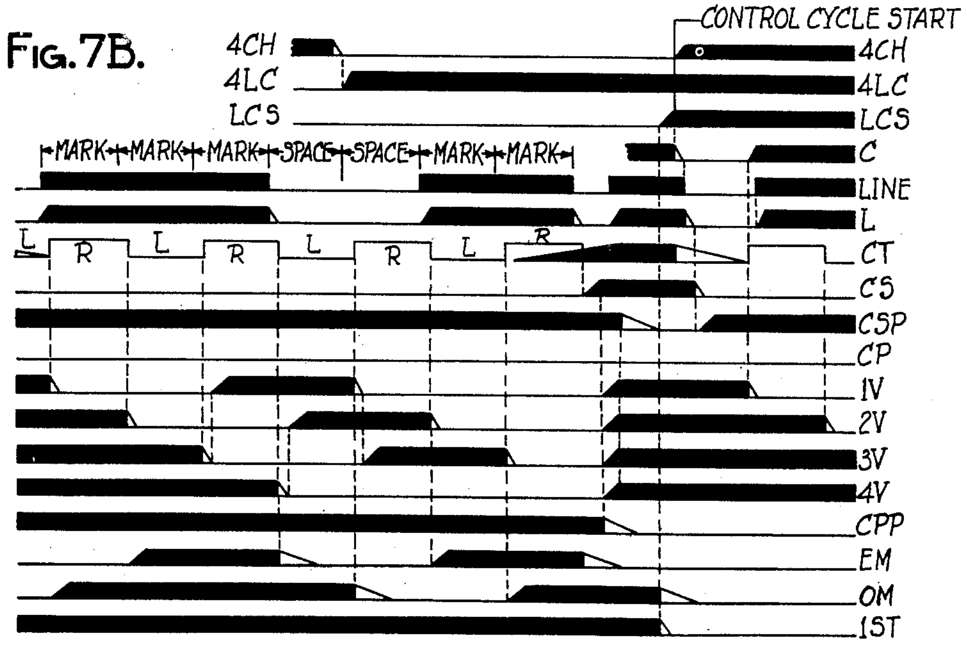
Figure 8A:
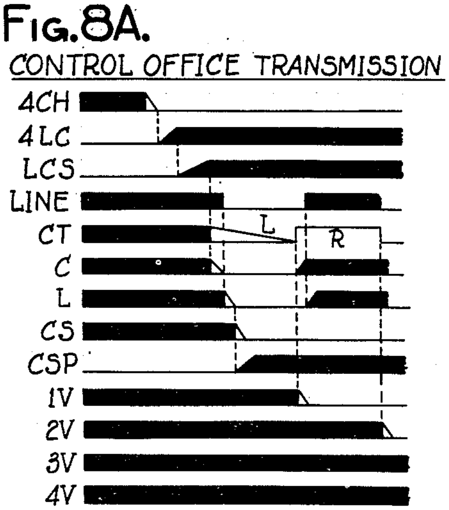
Figure 8B:
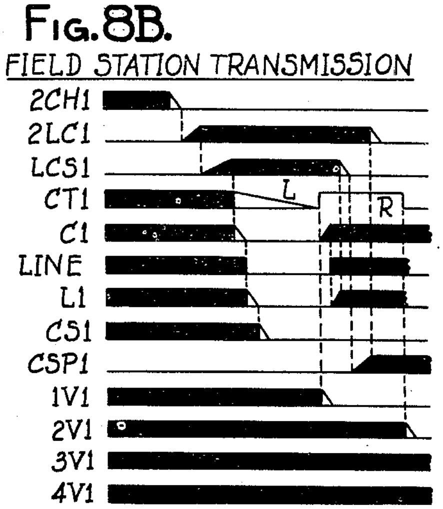

Figs. 6A and 6B, and 7A and 7B, are sequence charts illustrating approximate relative times of operation of the respective communication apparatus during a typical indication cycle; and Figs. 8A and 8B are sequence charts illustrating approximate relative times of operation of the communication apparatus at the control office and field station respectively under simultaneous start conditions.

Conventional schematic diagrams have been used for the disclosure of the system organization in the drawings, such drawings being prepared more particularly to facilitate an understanding of the mode of operation of the system, rather than to attempt to point out all of the necessary details of construction and specific arrangement of components that may be provided by those skilled in the art in accordance with the requirements of practice. The symbols (+) and (−) have been used to indicate connections to the respective positive and negative terminals of suitable batteries or other sources of direct current, and the symbols (B+) and (B−) have been used to indicate connections to the respective positive and negative terminals of a suitable split battery, or other source of direct current, having a center tap designated as (CN).

Figure 1A:
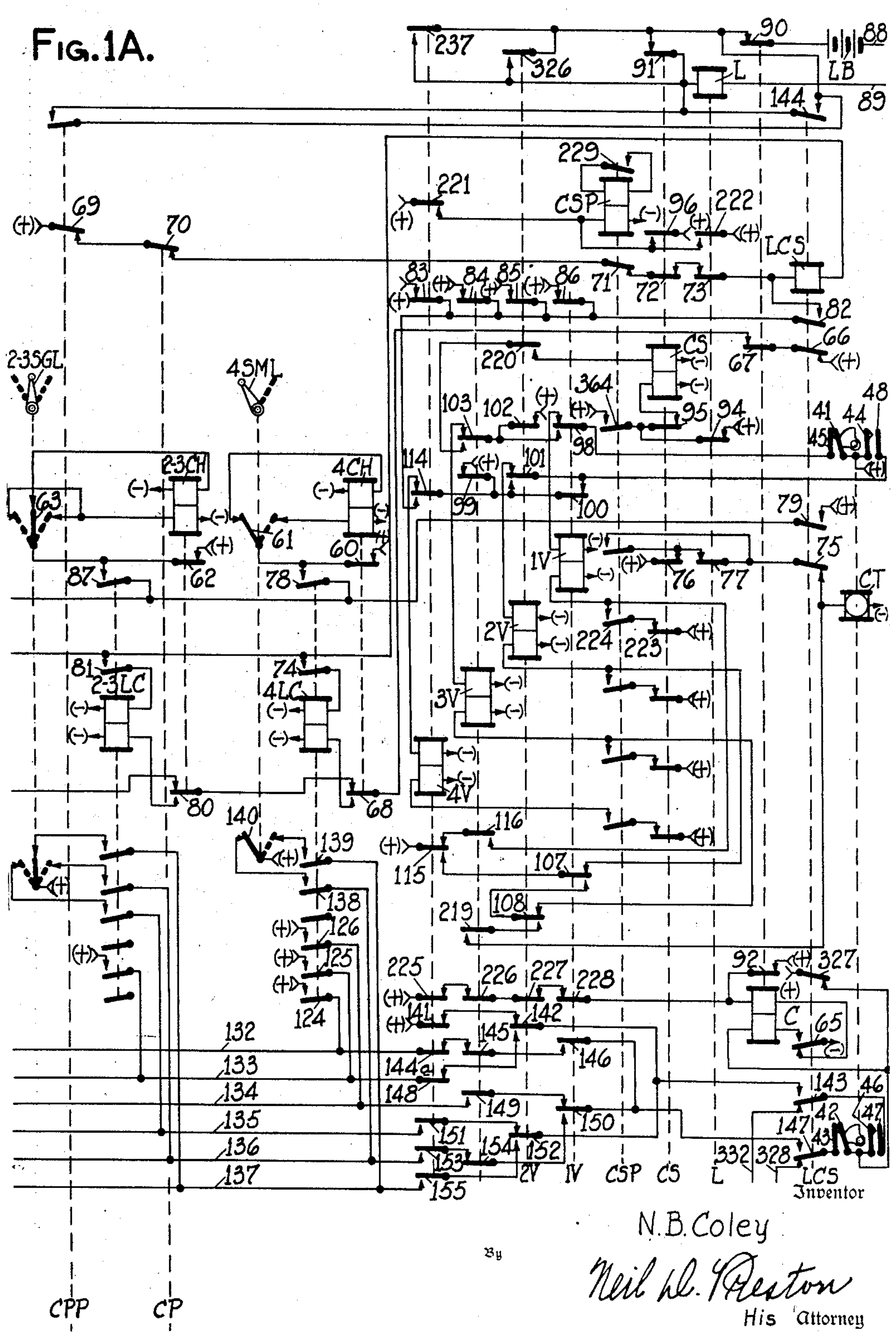
Figure 1B:
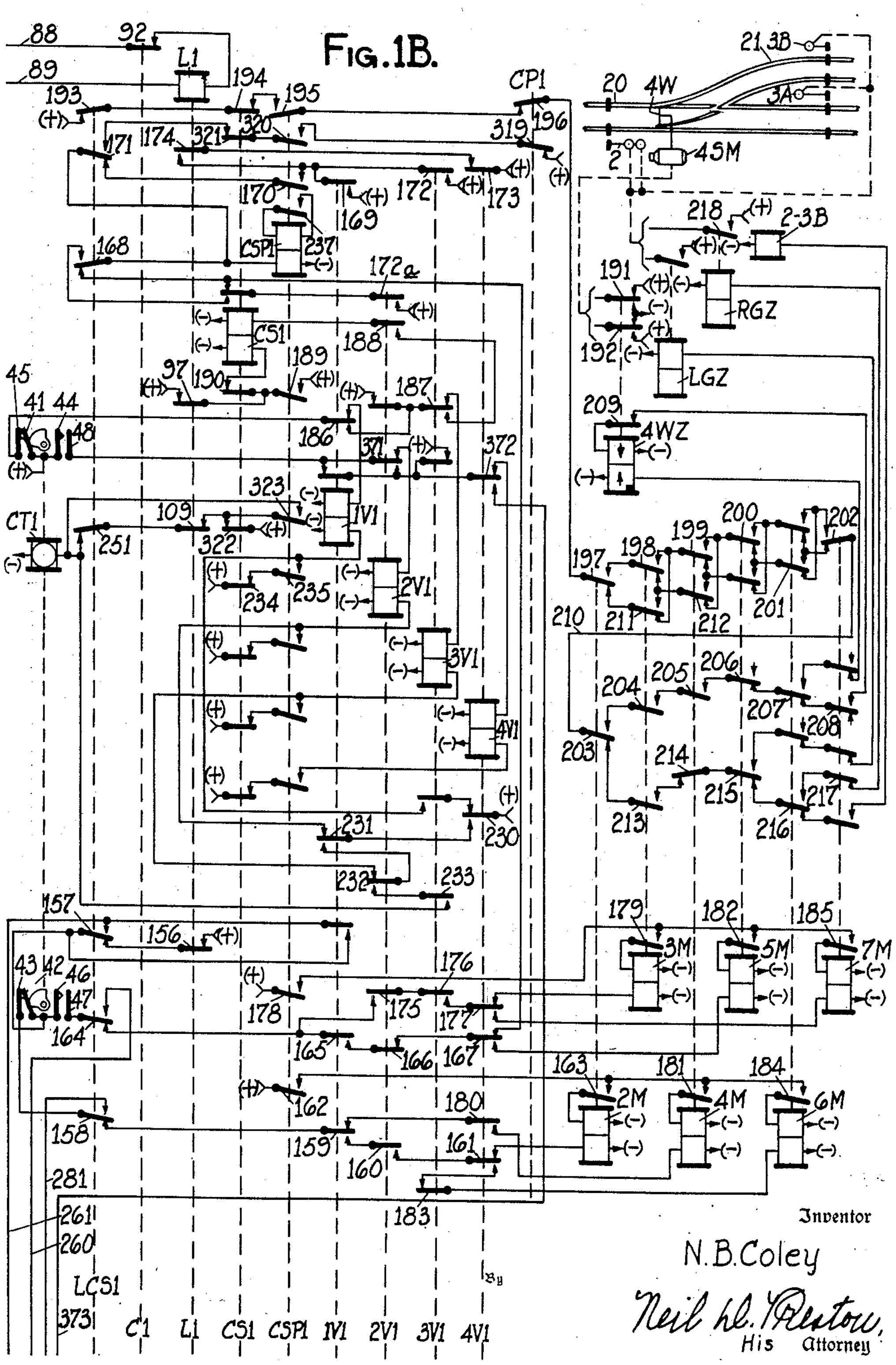

Although it is to be understood that the present invention is readily adaptable for the communication of switch and signal controls from a control office to a remote field station for a track layout having a relatively large number of track switches and signals to be controlled, for the purpose of simplification of this embodiment of the present invention, it has been considered sufficient for an understanding of the present invention that it be applied only for the control of a single track switch and signals governing traffic thereover, which may be considered, for example, as a small part of a larger railway interlocking system, other track switches and signals being governed by respective controls transmitted from the control office in a similar manner to that which will hereinafter be specifically considered for the control of the switch and signals that are illustrated in Fig. 1B. According to Fig. 1B, a main stretch of track 20 is illustrated as having a second track 21 connected thereto by a track switch 4W which is operated by a power switch machine 4SM. Eastbound traffic over the track switch 4W is governed by the signal 2, while westbound traffic over the track switch 4W is governed by the signals 3A and 3B.

It is to be understood that the system includes a suitable control machine, such as is well known in the art, for use at the control office in governing traffic through the track layout. This machine has a suitable control panel (not shown) having a track diagram constructed thereon with suitable indicator lamps being disposed along the trackway of the diagram for indicating the conditions of occupancy of the respective track sections within the control territory. Indicator lamps are also provided on the control panel in accordance with the requirements of practice for indicating the positions of track switches, the locked conditions of the track switches, and the conditions of the signals governing traffic through the track layout for which the control machine is provided.

Also disposed on the control panel, either directly on the track diagram, or below the track diagram, in accordance with the requirements of practice, are suitable levers or buttons for designation of the entrance and eixt ends of routes to be established, or for designation of the positions for the track switches, and signals to be controlled. Thus, for example, with reference to Fig. 1A, a switch control lever 4SML is provided for the control of the track switch 4W (see Fig. 1B), and the signal control lever 2—3SGL is provided for controlling the clearing of the signals governing traffic through the track switch 4W. The lever 4SML is a two-position lever, the left-hand position as shown in Fig. 1A being used for governing the power operation of the track switch 4W to its normal position, and the right-hand position of the lever 4SML being used for governing the power operation of the track switch 4W to its reverse position. The signal control lever 2—3SGL is a three-position lever wherein its center position is used for putting the associated signals to stop, its left-hand position is used for govering the clearing of a signal for westbound traffic, and its right-hand position is used for governing the clearing of a signal governing eastbound traffic. It is to be understood that these switch and signal control levers may be replaced by other types of manually operable switches, or by relays, or by buttons or any other suitable means that may be desired to be employed in practice for the designation of the controls that are to be transmitted for the control of respective track switches and signals.

Figures 2, 3, 4:
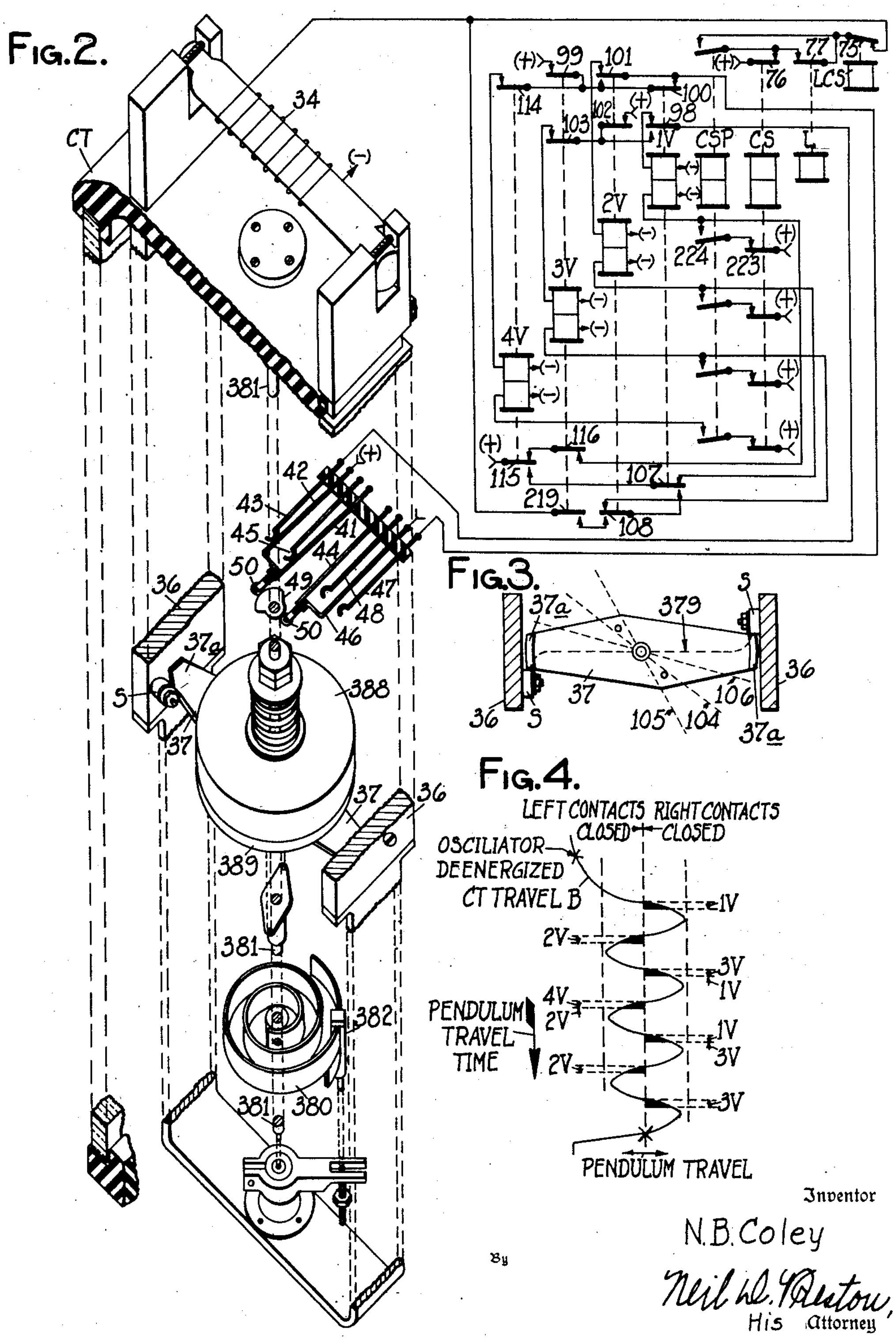
Fig. 2 is an exploded view, in perspective, of the principal operating parts of a code oscillator suitable for use as a timing device in governing the rate of stepping.
Fig. 3 is a plan view of a section of the oscillator illustrating the extent of rotation that provides suitable operating characteristics, and also illustrating the normal position of the oscillator armature when the oscillator is energized at a time when the system is at rest, or at a midpoint in an indication cycle of operation.
Fig. 4 is a pendulum travel diagram showing points in the travel of the oscillator pendulum during a cycle of operation at which the respective stepping relays are actuated.

Although different types of timing devices may be used for governing the rate of operation of the stepping, the timing device employed in this embodiment of the present invention is illustrated in Fig. 2 as being of the torsional pendulum type of the general character disclosed in the patent to O. S. Field, No. 2,351,588, dated June 20, 1944. This oscillator, according to the Field patent, is adapted to be driven at a constant rate and to be energized for a limited period of each of its operating cycles so as to maintain its oscillations continuously at a uniform rate as long as energy is applied to the device. For the purpose of the present invention, however, it is considered more desirable that the oscillator mechanism be normally inactive but retained in a predetermined one of its extreme rotated positions so that it can be started from a predetermined contacting position when it is desired to initiate the stepping of code communication apparatus at the associated station. Therefore the oscillator according to the Field patent is preferably modified to provide that its winding is normally steadily energized when the system is at rest, and upon setting the code communication system into operation, energy is removed from the electromagnet of the associated oscillator CT, and the torsional pendulum of the oscillator is thus permitted to swing free in oscillations, the amplitude and periodicity of which is determined by the characteristics of a torsional involute spring such as the spring 380 illustrated in Fig. 2, for example, combined with the inertia of the torsional pendulum 388, to obtain the desired frequency of operation.

It is desirable that each oscillator CT be provided with suitable stops S against which the armature 37 is maintained when the system is at rest as is shown in Fig. 3, and as is fully disclosed in my prior application, Ser. No. 155,720, dated April 13, 1950, and reference is to be made to this prior application for a more complete disclosure as to the modified oscillator structure preferably provided in accordance with the use of stops S as is shown in Figs. 2 and 3 of the present application. For an understanding of the mode of operation of the oscillator CT sufficient for the purpose of the present invention, it will be noted that the armature 37 (see Fig. 3) is normally maintained in its position wherein the ends 37*a* of the armature 37 are magnetically attracted against the magnetic stops S which are so disposed as to form a magnetic path of lowest reluctance for the magnetic field of the oscillator as indicated by the dotted line 379 extending between the pole pieces 36. It will thus be seen that the magnetic field set up through the armature 37 and the stops S is such as to magnetically maintain the armature 37 against the stops as long as the winding 34 (see Fig. 2) of the oscillator CT is maintained energized.

Upon deenergization of the winding 34, the oscillator armature 37 is released from its attracted position against the stops S, and thus the pendulum 388 starts to rotate because of the torsional force of the spring 380 which is applied to the rotating shaft 381. If this oscillator were to be maintained steadily deenergized until the pendulum 388 were to come to rest, the armature would assume a center line position as indicated by the center line 104 of Fig. 3. Thus this center line 104 represents the neutral position with respect to torsional force applied by the spring 380 to the shaft 381.

Inasmuch as only four free successive excursions of the oscillator CT are required at one time for the operation of the code communication system according to this embodiment of the present invention, there is no substantial decay in the amplitude of the excursions, but each excursion is a little shorter in accordance with the friction, air resistance, etc. that is inherent in the timing device. Such reduction in amplitude is illustrated in the pendulum travel diagram of Fig. 4. This reduction in travel, however, has no effect upon the rate of stepping, because of the stepping taking place in response to the shifting of contact positions of the contacts actuated by the oscillator only when the oscillator swings through center position 104 (see Fig. 3). By this arrangement, a highly accurate rate of stepping is set up, based on the well known principle that a torsional pendulum has a constant period of oscillation for respective successive excursions of free oscillation, within certain limits of spring tension, after the oscillator is unlocked from its normal position and permitted to swing free.

In accordance with the rotary oscillations of each oscillator CT, respective left movable contact fingers 41 and 42 (see Fig. 2), and right contact fingers 46 and 44 are selectively alternately opened and closed against cooperating fixed fingers 45 and 43, and 47 and 48, respectively, by a suitable actuating cam 49, or other suitable contact actuating means, secured on the shaft 381. This cam 49 has been illustrated as having actuating rollers 50 associated therewith which actuate the movable contact fingers in accordance with the following of the contour of the cam 49 by the rollers 50. The structure of the cam 49 is preferably such that when the oscillator mechanism has been deenergized for a period of time to permit it to come to rest along the center line 104 of Fig. 3, the respective left and right-hand edges of the cam 49 bear against the respective rollers 50 so that a slight rotation of the shaft 381 in either direction is effective to close one or the other of the left-hand or right-hand contacts, dependent upon the direction of rotation. Thus by this adjustment, and by the contour of the cam 49, the left-hand contacts as shown in Fig. 2, and as schematically illustrated in Figs. 1A and 1B, are maintained closed for the half of each period of oscillation when the armature is rotated counter-clockwise from its center line 104 as shown in Fig. 3, and the right-hand contacts are closed for the portion of each excursion of the oscillator when the armature is in a position rotated clockwise from the center line 104. Although the amplitude of the excursion of the oscillator is dependent upon the mass of the pendulum 388 cooperating with the torsional spring 380, approximate suitable average limits of the excursion are illustrated by the dotted radial lines 105 and 106 of Fig. 3.

It is to be understood that the adjustment of the active length of the torsional spring 380 may be made by the setting of the adjusting lug 382, and that the inertia of the pendulum 388 is relieved by the pendulum 388 being friction coupled to the shaft 381 through the friction disc 389 when the armature is stopped abruptly by the stops S as is fully described in my above mentioned prior application.

Although the timing device illustrated and specifically described is well adapted for use with the embodiment of the present invention that is specifically illustrated, it is to be understood that other types of timing devices may be employed, provided that they may be adapted to provide the accuracy required in timing for the respective steps in accordance with the requirements of practice. It will be readily apparent that the accuracy of the timing devices for timing the respective steps is a determining factor with respect to the possible speed of code communication, and maximum speed of code transmission and reception can be accomplished only by the use of the most accurate timing device for timing the duration of the respective steps.

The present invention is not particularly concerned with the character of the line circuit facilities connecting the control office and the field station in that any conventional line circuit connection means providing a continuous single channel for communication can be employed. Thus the system can be used with a direct wire line circuit, as a carrier circuit applied to line wires used for other purposes, or other conventional line circuit facilities may be employed. The line circuit is normally energized, and if a direct connecting D. C. line circuit is employed as illustrated in Figs. 1A and 1B, only a single line battery LB is required, and this line battery can either be provided at the control office or at the field station in accordance with the requirements of practice. Each station has a line relay L included in series in line circuit, and this relay is preferably of the fast acting polar type for maximum speed of operation with low operating current. A suitable relay of this character is disclosed, for example, in the patent application of O. S. Field, Ser. No. 122,475, filed October 20, 1949.

Both stations have a group of relays, CH, LC, LCS, CS, and CSP, which are particularly involved in the initiation, or providing special control features, during a cycle of operation. A relay CH and LC is provided for each device such as a track switch, or for each pair of opposing signals that is to be distinctively controlled from the control office. These relays are used at the control office in the storing of designated controls for transmission, and in permitting but one control to be transmitted at a time. The relay LCS also serves in this same connection to prevent the interruption of a cycle of operation by the designation of controls for transmission at a time when the system is in use for the transmission of prior designated controls. A similar group of relays is provided at the field station for governing the transmission of indications from the field station to the control office. The relay CS1 at the field station is provided particularly for assisting in setting the receiving apparatus into operation, and in the control of an associated repeater relay CSP1 so as to provide for the proper execution of controls received during a control cycle at the field station. Corresponding relays CS and CSP act in a similar capacity at the control office upon the reception of indications to form a distinctive channel of communication under certain conditions upon the completion of the stepping.

A relay C is provided at both the control office and the field station as a code transmitter relay, the actuation of which is effective to pulse the line circuit in accordance with each particular code that is selected for transmission.

A bank of stepping relays V is provided at each station for counting the respective code characters transmitted during a cycle of operation of the communication system. For the embodiment of the present invention illustrated, only four relays V are required for providing seven communication channels.

Decoding relays M are provided at the field station (see Fig. 1B) for the reception of controls, these relays being provided for storing the respective "mark" characters that are received during the reception of a control code until such time as the code is complete, and execution of the control can be rendered effective.

Similarly relays OM and EM are provided at the control office for energization when "marks" are received as respective odd and even numbered characters of the indication codes.

Relays CP and CPP are provided at the control office, and a relay CP is provided at the field station for use particularly in governing the repeat of the complete operation of the stepping relay banks at the respective stations for indication cycles in order that a sufficient number of indication channels of communication may be provided to satisfy general indication requirements for the particular number of devices that can be controlled during a control cycle.

Various application relays WZ, LGZ, RGZ, and B are provided for governing the control of devices at the field station in accordance with control codes communicated from the control office. Of these relays, the relay WZ is a magnetic stick relay used for the control of a power track switch, while the relays LGZ and RGZ are shown as neutral relays having stick windings which can be energized according to the usual practice for stick signal control purposes. The relay B is provided for the purpose of putting a signal to stop in accordance with the reception of a stop code which may be communicated from the control office.

At the field station suitable signal repeater relays RM and LM and a track relay TR are shown in block form without their specific circuits being illustrated, as the control circuits for these relays are well known to those familiar with the art.

Figure 1C:
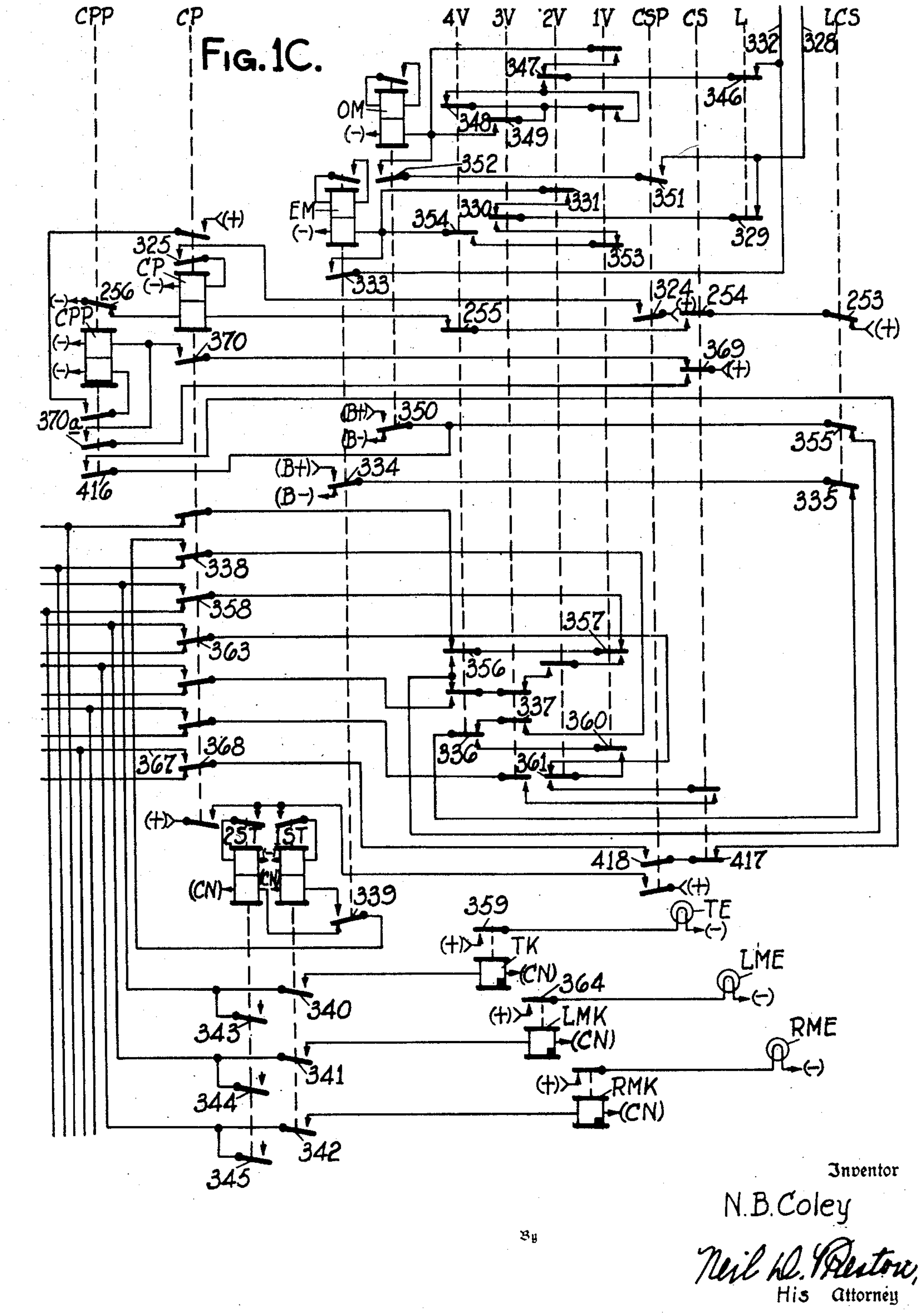

The reception of indications at the control office provides for the control of suitable magnetic stick relays such as the relays RMK, LMK, and TK which are illustrated in Fig. 1C as being controlled in response to specific indication codes which may be communicated from the field station.

Indicator lamps RME, LME and TE which may be provided on the control channel of the control machine (not shown) are illustrated as being governed by the magnetic stick indication relays RMK, LMK, and TK.

Having thus considered in general the organization of the system, a consideration in detail as to the circuits involved for the control of the respective relays will be hereinafter given along with a description of the mode of operation of the system during typical operating conditions.

*Operation*

Before considering specifically the circuit organization and mode of operation under typical operating conditions, it is believed expedient to consider the mode of operation in general without specific reference to the circuits involved in such operation.

If it is desired to transmit a control from the control office to the field station for setting up a route, the operator of the control machine first actuates all of the switch control levers required for obtaining the proper positions of the track switches to set up a route, and then he actuates the signal control lever SGL (see Fig. 1A) for the signal governing entrance to the route. In accordance with the actuation of these respective levers, an associated relay CH is dropped away, and the dropping away of this relay is effective to cause the picking up of the associated relay LC, and the system relay LCS. The picking up of the system relay LCS deenergizes the oscillator CT, and thus sets the oscillator into operation to actuate the stepping relays and selectively govern the energization of the code transmitter relay C for the transmission of a control code corresponding to the first of the controls to be transmitted.

With reference to the diagram of Fig. 4, when the pendulum of the oscillator CT first swings through its center position, the opening of the contacts of the oscillator CT is effective to deenergize the relay 1V, and similarly for each of the subsequent swings of the pendulum in the same direction through the center position, an odd numbered stepping relay V is dropped away. Similarly upon the rotation of the pendulum through center in the opposite direction to complete the first excursion of the pendulum, the second step is taken by the dropping away of the relay 2V, and on subsequent similar operations of the oscillator pendulum in the same direction through center, an even numbered step is taken by the dropping away of an even numbered stepping relay V.

It will be noted with reference to Fig. 4 that during the second excursion of the oscillator pendulum 388 from its initial position, the stepping relay 1V is picked up in response to the dropping away of relay 3V, so that this relay can be used a second time for defining the beginning of a step. Similarly the dropping away of relay 4V causes the picking up of relay 2V, so that relay 2V can be used again to form an additional step; and the dropping away of relay 1V during the third excursion of the pendulum causes the picking up of the relay 3V, so that this relay can also be used for the second time to form an additional communication channel.

Thus the stepping relays are deenergized successively in numerical order to form the respective steps, the relays 1V, 2V, and 3V being used over for the second time to form a complete complement of seven steps when the following distinctive seven conditions of the stepping relays are established:

| Step No. | Stepping relay positions |
|---|---|
| 1 | 1V down—4V up |
| 2 | 2V down—4V up |
| 3 | 3V down—4V up |
| 4 | 4V down—1V up |
| 5 | 1V down—4V down |
| 6 | 2V down—4V down |
| 7 | 3V down—4V down |

It can thus be said that the respective steps are effectively coded in that they are made up of respective distinctive combinations of front and back stepper relay contacts in seven different combinations, these combinations being so selected for transmission of code characters in the control circuit for the code transmitter relay C that seven distinctive communication channels are provided for code transmission. The energization of these respective seven channels is in accordance with power applied through the front contacts of whichever one of the relays LC may be picked up in accordance with the designation of the particular switch or signal control to be transmitted. The energization of any one of these channels during a control cycle determines that the corresponding code element is to be a "mark," and the absence of energy applied to any one of these respective channels provides for the transmission of a "space" for the corresponding code character. For lockout purposes, the first character transmitted from the control office is always a mark, and thus this channel is not used for code communication purposes. The manner in which the mark under these conditions is effective to lock out a simultaneous field station start will be hereinafter more specifically considered.

At the field location, the line relay L1 (see Fig. 1B) is normally energized, and the deenergization of this relay in accordance with the start of the transmission of a control cycle at the control office is effective to initiate the actuation of the code oscillator CT1, and thus initiate the stepping at the field location which takes place in a manner comparable to the stepping at the control office. Thus the field stepper is not necessarily actuated at the same time as the stepper at the control office, where line propagation time is considered, but the stepper is actuated at the same rate as the stepper at the control office because of the code oscillators CT at the respective control office and field location being accurately matched in their operating characteristics so that when they are permitted to operate in free oscillations upon removal of energy, the rate of operation is the same at both the transmitting and receiving stations.

At the field location, a decoding relay M is picked up for each mark that is received during the particular one of the steps with which the relay M is associated, the picking up of this relay being rendered effective in response to the dropping away of the stepping relay for the associated step, provided that the line relay L is picked up at this time. It will be noted with reference to Fig. 1B that there is no relay 1M because the first character transmitted is always a mark for lockout purposes as has been heretofore considered, and the lockout condition is satisfied in the control of the relay CSP1 particularly so as not to require a relay M for the reception of this first character. Each relay M when picked up is maintained energized by a suitable stick circuit until the end of the cycle, subsequent to the execution of the code that has been received.

Although other types of execution circuit selections may be employed in accordance with the requirements of practice, the embodiment of the present invention illustrated in Fig. 1B provides for an execution circuit affording a parity check of the code so as to eliminate to a large extent the possibility of a reception of a garbled code as being effective to actuate any switch or signal control relay. This parity check system requires communication of codes always having an even number of marks (not including the mark for the first step), and the system for the selection of codes for transmission at the control office is so arranged that each code transmitted comprises an even number of marks (not including the mark for the first step). It is thus provided that should a single mark be lost in the transmission of a code so as not to be received at the field location, the reception of an odd number of marks would prevent execution of the code, and thus there would be no switch or signal control relay actuated as the garbled code would be detected by the parity check system to prevent the execution of a faulty code. Similarly if an additional mark were received by picking up energy on the line circuit from an extraneous source during a single period originally employed for the designation of a space, the reception of one additional mark would prevent the execution of the code at the end of the cycle from being effective to control any switch or signal application relay. It will thus be seen by this organization that any distortion of the code received at a receiving station must be in the order of the addition or subtraction of an even number of marks in order that the code may be received undetected as a distorted code and used for the erroneous control of a switch or signal control application relay at the field location. It is to be further understood that the codes employed could as well have odd numbers of marks if the parity check circuit is arranged as provided in the above mentioned application of Coley and Albrighton, Ser. No. 207,253, filed January 23, 1951.

The mode of operation for the communication of indications is in general similar to that which has been described for the transmission of controls, except that the initiation of the respective indication cycles is automatic by the dropping away of the relay CH1, as compared to being initiated by the dropping away of the relay CH at the control office in accordance with the manual actuation of a switch or signal control lever. The indications to be communicated are divided into groups of sizes that can be handled in accordance with the capacity of the system for transmission during a single indication cycle, each group having its start relay CH1, and code determining relay LC1. The number of available channels of communication during an indication cycle is 14 because of the repeat of the stepping banks for an indication cycle, except that the first character transmitted is always a space as a part of the lockout system which will be hereinafter specifically considered for giving preference to a control office start when the field location and control office both have simultaneous starts. Although it would appear from the circuits shown in Fig. 1D that the first character transmitted is always a mark rather than a space because of energy being applied to the first channel wire to cause the picking up of the transmitter relay C1 at the field location to close the line circuit for the first character to be transmitted, the line circuit is maintained open at this time at the control office under normal conditions of communication for an indication cycle so that this first character is received at the control office as a space. This is done in order that upon simultaneous starts of the two transmitting stations, the mark applied by the control office may be received as a mark at the field station by reason of the line circuit at the field station being closed.

The reception of an indication cycle at the control office causes the selective energization of the relays OM and EM in accordance with the reception of respective odd and even numbered marks. It will be noted that this pair of mark receiving relays can serve for reception on all channels, as compared to separate mark relays M for the respective channels being required for the reception of controls at the field location. This is because of it being considered unnecessary to use the execution type of decoding circuits for the reception of indications. Thus the respective magnetic stick indication receiving relays at the control office are actuated as the respective code characters for their control are received.

Having thus considered in a general manner the mode of operation of the system for the communication of controls and indications, consideration will now be given as to the specific circuit organizations involved in providing the general mode of operation that has been described.

*Initiation of control cycle*

Although it should be readily apparent to those skilled in the art that different systems of initiation of a control cycle which are known in the art may be employed with a system of this character, the system according to the embodiment of the present invention illustrated in Fig. 1A is organized so that no start buttons are required as the relays CH are so governed by polarized circuits as to be actuated whenever the associated switch or signal control lever is moved to a new position. For providing this mode of operation, the respective switch and signal control levers can be considered circuitwise as pole changing levers in that each time the lever is actuated to a new position, the circuit for the associated change relay CH is pole changed through its stick contact so as to cause that relay to be dropped away for initiation of a control cycle, restoration of the relay being effected by energy of the newly selected polarity upon the picking up of the associated relay LC when the cycle is actually initiated. The relay 4CH, which is associated with the switch control lever 4SML, is normally energized by a stick circuit extending from (+), including front contact 60 of relay 4CH, contact 61 of lever 4SML in its left-hand position, and upper winding of relay 4CH to (—). Similarly the relay 2—3CH, which is associated with the signal control lever 2—3SGL, is normally energized by a circuit extending from (+), including front contact 62 of relay 2—3CH, contact 63 of lever 2—3SGL in its center positions and upper winding of relay 2—3CH, to (—).

If the lever 4SML is moved from its normal to its reverse position (right-hand position), for example, the circuit just described for the relay 4CH is pole changed by the shifting of the contact 61 of the lever 4SML, and thus the relay 4CH is dropped away upon energization of the lower winding of the relay with the opposite polarity.

Upon the dropping away of relay 4CH, assuming the system to be at rest at this time, a pickup circuit is closed for the relay 4LC extending from (+), including back contact 66 of relay LCS, front contact 67 of relay C, back contact 68 of relay 4CH, and lower winding of relay 4LC, to (—). The picking up of this relay closes a stick circuit for its upper winding, including the winding of relay LCS, and extending from (+), including back contact 69 of relay CPP, back contact 70 of relay CP, back contact 71 of relay CSP, front contact 72 of relay CS, front contact 73 of relay L, winding of relay LCS, front contact 74 of relay 4LC, and upper winding of relay 4LC, to (—). The picking up of relay LCS starts the stepping of the cycle by the deenergization of the oscillator CT upon the opening of back contact 75 of relay LCS, through which the oscillator CT has been normally steadily energized. The circuit by which the oscillator CT has been normally steadily energized extends from (+) including front contact 76 of relay CS, front contact 77 of relay L, back contact 75 of relay LCS and winding of oscillator CT, to (—).

The relays 4LC and LCS are maintained energized throughout the cycle by the stick circuit that has been described, together with other stick circuits to be hereinafter considered, and the relay 4LC in picking up is effective by the closure of front contact 78 to establish a pickup circuit for the relay 4CH extending from (+), including front contact 79 of relay LCS, front contact 78 of relay 4LC, contact 61 of lever 4SML in its right-hand position, and lower winding of relay 4CH, to (—).

Having thus considered specifically the mode of operation upon initiation of a cycle of operation in accordance with the actuation of the lever 4SML to its right-hand position for designation of the track switch 4W to be operated to its reverse position, it should be readily apparent from the description as set forth, that a similar mode of operation is effected upon actuation of the lever 4SML in the opposite direction for the designation of the track switch 4W to be operated to its normal position, the actuation of the lever 4SML in either case being effective to pole change the relay 4CH and thus cause that relay to be dropped away so as to initiate the control cycle.

The initiation of a control cycle for the transmission of a signal control is similarly effected in that the actuation of the three position signal control lever 2—3SGL to any new position is effective to pole change the associated change relay 2—3CH and thus cause that relay to be dropped away so as to effect the picking up of the relays 2—3LC and LCS. Thus, for example, the actuation of the lever 2—3SGL to its right-hand position for governing the clearing of signal 2 for eastbound traffic pole changes the relay 2—3CH which has been described as having its upper winding normally energized through the contact 63 of the lever 2—3SGL in its center position.

The movement of the lever 2—3SGL in either direction from its center position opens the circuit for the upper winding of relay 2—3CH at contact 63, and establishes a circuit for the energization of the lower winding with opposite polarity. Thus, for example, if the lever 2—3SGL is actuated to its right-hand position for designation of a signal to be cleared for eastbound traffic, the lower winding of relay 2—3CH is momentarily energized by a circuit extending from (+), including front contact 62 of relay 2—3CH, contact 63 of lever 2—3SGL in its right-hand position, and lower winding of relay 2—3CH, to (—). This energization is of a polarity to oppose the flux previously set up by energization of the upper winding, and thus the relay 2—3CH is dropped away, and the circuit just described is opened at front contact 62.

Upon the dropping away of relay 2—3CH, if the system is at rest, the relay 2—3LC is picked up by the energization of a circuit extending from (+), including back contact 66 of relay LCS, front contact 67 of relay C, front contact 68 of relay 4CH, back contact 80 of relay 2—3CH, and lower winding of relay 2—3LC, to (—). Relay 2—3LC when picked up causes the picking up of relay LCS by the energization of a circuit extending from (+), including back contact 69 of relay CPP, back contact 70 of relay CP, back contact 71 of relay CSP, front contact 72 of relay CS, front contact 73 of relay L, winding of relay LCS, front contact 81 of relay 2—3LC, and upper winding of relay 2—3LC, to (—). Relay LCS when picking up for the initiation of transmission of either a switch or a signal control code is maintained picked up throughout the cycle, along with the associated relay LC, by reason of stick energy being applied through the stick contact 82 of relay LCS, and through the front contacts 83, 84, 85, and 86 of the relays 4V, 3V, 2V, and 1V respectively connected in multiple.

After the picking up of the relay LCS in response to initiation of a control cycle in accordance with the picking up of relay 2—3LC, the relay 2—3CH is restored to its picked up position by the energization of a circuit extending from (+), including front contact 79 of relay LCS, front contact 87 of relay 2—3LC, contact 63 of lever 2—3SGL in its right-hand position, and lower winding of relay 2—3CH, to (—).

The line circuit comprising the line wires 88 and 89 connecting the control office and the field location is normally energized by a circuit extending from the positive terminal of the line battery LB through front contact 90 of relay C, front contact 91 of relay CS, winding of relay L, line wire 89, winding of relay L1, front contact 92 of relay C1, and line wire 88, to the negative terminal of the line battery LB.

The picking up of the relay LCS opens the circuit at back contact 65 which has been effective to maintain the relay C normally energized. This circuit extends from (+) including front contact 92 of relay C, upper winding of relay C, and back contact 65 of relay LCS, to (—). Thus the dropping away of relay C opens the line circuit at front contact 90 and causes the dropping away of the line relays L and L1 at the control office and field station respectively. The dropping away of relay L opens the stick circuit by which the relay CS has been maintained normally energized at front contact 94. This stick circuit extends from (+) including front contact 94 of relay L, front contact 95 of relay CS, and lower winding of relay CS, to (—). The dropping away of relay CS opens the front contact 91 in the line circuit through which the line circuit is normally energized. Relay CS when dropped away closes an obvious pickup circuit for relay CSP at back contact 96 so as to cause the relay CSP to be picked up and to remain picked up until the relay CS is again energized.

Similarly, at the field location the dropping away of the line relay L1 at the beginning of the cycle is also effective to cause release of the normally energized cycle start relay CS1 by the opening of front contact 97. This relay CS1 is normally maintained picked up by a stick circuit comparable to that which has been described for the relay CS at the control office.

*Stepping*

The circuit organizations for the stepping relay banks at the respective control office and field stations are similar, and thus a detailed consideration of the stepping at the control office should suffice for an understanding of the circuit organization and mode of operation of the stepper at the field location. To consider stepping at the control office it will be assumed that initiation is made for the transmission of a reverse switch control code for the track switch 4. The oscillator CT at the control office is initiated as has been described, and when the pendulum first rotates through its center position, it opens the contact fingers 41 and 45, which causes the dropping away of the first stepping relay 1V.

The relay 1V has been maintained picked up when the system is at rest by a stick circuit extending from (+), including contact fingers 41 and 45 of the oscillator CT, front contact 98 of relay 1V and upper winding of relay 1V, to (−). The relay 2V is maintained energized at this time by a stick circuit extending from (+), including front contact 99 of relay 3V, front contact 100 of relay 1V, front contact 101 of relay 2V and upper winding of relay 2V, to (−). The relay 3V is maintained picked up at this time by a stick circuit which extends from (+), including front contact 102 of relay 2V, front contact 103 of relay 3V and upper winding of relay 3V, to (−). Relay 4V is maintained picked up at this time by a stick circuit extending from (+), through front contact 99 of relay 3V, front contact 114 of relay 4V and upper winding of relay 4V, to (−).

Of the stick circuits that have been described for the relay 2V, 3V, and 4V, only the stick circuit for relay 2V is opened by the dropping away of the relay 1V at front contact 100. The closure of contact fingers 44 and 48 of the oscillator CT when the pendulum rotates through its center position for the first time has, however, established a stick circuit applying energy directly to the stick contact 101 to maintain the relay 2V energized until the contacts 44 and 48 are opened upon the return of the oscillator pendulum for the first excursion when it passes through center. Thus, the opening of the normally energized stick circuit for the relay 2V, and the closure of the stick circuit dependent upon the oscillator contacts 44 and 48 conditions the relay 2V so that it is dropped away upon the passing of the oscillator pendulum through center during the last half of the first excursion.

Upon the dropping away of the relay 2V, the stick circuit that has been described for the energization of the relay 3V is opened at front contact 102 of relay 2V, but the relay 3V is maintained energized at this time by another stick circuit extending through the contact fingers 41 and 45 of the oscillator CT, back contact 98 of relay 1V, and front contact 103 of relay 3V. It is therefore provided that the relay 3V is conditioned to be dropped away during the passage through center of the oscillator operating mechanism during the first half of the second excursion as is illustrated in Fig. 4 so that the relay 3V is dropped away upon the opening of the contact fingers 41 and 45 of the oscillator CT for the second time during the stepping cycle.

Relay 3V, when dropped away, establishes a pickup circuit for the relay 1V so as to condition the relay 1V for use as has been described generally in forming an additional step. The circuit for the energization of relay 1V under these conditions extends from (+), including front contact 115 of relay 4V, back contact 116 of relay 3V, and lower winding of relay 1V, to (−).

The stick circuit that has been described as being normally energized for the relay 4V is opened at the front contact 99 upon the dropping away of relay 3V so that the relay 4V is maintained energized in a manner comparable to that which has been specifically considered for the relay 2V, by a circuit extending through contact fingers 44 and 48. Thus the relay 4V is conditioned so that it is the next relay to be dropped away, and which is dropped away upon the return rotation through center of the oscillator operating mechanism during the last part of its second excursion during the stepping cycle. Thus the opening of contact fingers 44 and 48 causes the dropping away of the stepping relay 4V at this time. The relay 4V, when dropped away, closes a pickup circuit for relay 2V so as to condition the relay 2V for use in forming an additional step. The relay 2V is picked up under these conditions by a circuit extending from (+), including back contact 115 of relay 4V, front contact 107 of relay 1V and lower winding of relay 2V, to (−).

The dropping away of the relay 4V opens the pickup circuit that has been described for the relay 1V at front contact 115, and thus causes the relay 1V to be dependent for energization upon a circuit which has been described for that relay extending through the contact fingers 41 and 45 of the oscillator CT, which are closed at this time. Thus the relay 1V is conditioned so that it can be dropped away upon the passage of the operating mechanism of the oscillator CT through center during the first half of the third excursion of the operating mechanism.

As is indicated in the diagram of Fig. 4, the dropping away of the relay 1V for the second time causes the picking up of the relay 3V so that it can be used over again to form an additional step. The pickup circuit for relay 3V under these conditions extends from (+), including back contact 115 of relay 4V, back contact 107 of relay 1V, front contact 108 of relay 2V, and lower winding of relay 3V, to (−).

For the return rotation of the oscillator pendulum through center during its third excursion, the relay 2V is dropped away because of the opening of its stick circuit at contact fingers 44 and 48 of the oscillator CT, the pickup circuit for the relay 2V having been opened at front contact 107 by the dropping away of relay 1V.

The dropping away of the relay 2V for the second time during the cycle of operation of the stepping bank opens the pickup circuit that has just been described for the relay 3V at front contact 108, and thus causes the energization of the relay 3V to be dependent upon its stick circuit for its upper winding extending through the contact fingers 41 and 45 which are closed only until the oscillator mechanism passes through its center position during the first half of its fourth excursion. The opening of the contact fingers 41 and 45 at this time thus cause the dropping away of the relay 3V as the last step in the operation of the stepping relay bank at the control office for a control cycle.

Having thus described specifically the mode of operation of the stepping bank at the control office, it is to be understood that a similar mode of operation and a similar circuit organization is effective at the field location for the operation of the stepping relays 1V1, 2V1, 3V1, and 4V1 in accordance with the operation of the oscillator CT1, which is initiated by the opening of its normally energized circuit at front contact 109 of the line relay L1, the circuit for the normal energization of the relay CT1 being comparable to the circuit that has been described for the normal energization of the relay CT at the control office.

*Message transmission*

It has been pointed out that transmission of controls is accomplished by "mark" and "space" characters transmitted from the control office to the field location to form respective control codes, one cycle of operation of the communication system being used for transmission for each device to be controlled.

The selection of the code characters used for transmission is in accordance with whichever one of the relays LC (see Fig. 1A) at the control office has been picked up. This is because each of the characters transmitted, except the first character which is always a mark, is determined by a circuit through a front contact of a relay LC, only one relay LC being picked up at a time in accordance with the chain circuit organization for the picking up of the relays LC as has been heretofore considered. Thus the relay 4LC when picked up, for example, is illustrated as having contacts which determine as to whether the respective characters transmitted during a control cycle are marks or spaces in accordance with a predetermined code. If energy is applied through these contacts, it is determined that the corresponding character is a mark, and if no energy is applied, it is determined that the associated character is a space. The first group of code characters transmitted are more particularly assigned to the identification of the particular device to be controlled, and the last group of characters is particularly used for identifying the particular position to which the device selected by the first group of characters is to be operated. Thus the relay 4LC when picked up selects a first group of characters comprising respectively three marks and a space for identifying the track switch 4W as the device to be controlled, and the last two characters determine the position to which the track switch 4W is to be operated in accordance with whether the lever 4SML is in its normal or reverse position. Thus, the control code for transmission of a reverse control for the track switch 4W comprises the characters "mark-mark-mark-space-space-mark." This is in addition to the first character which is always a mark as has been heretofore described. If the control code to be transmitted is for the operation of the track switch 4W to its normal position, the code selected for transmission by the relay 4LC in combination with the lever 4SML being in its left-hand position is "mark-mark-mark-space-mark-space."

It is therefore provided that during transmission of a control cycle with the relay 4LC picked up, the closure of front contacts 124, 125, and 126 applies energy directly to the channel wires 132, 133, and 134 respectively. Because of the fifth character transmitted being a space, there is no energy applied to the fifth channel wire 135 through a contact of relay 4LC, and energy is applied to the sixth or seventh channel wire 136 and 137 in accordance with whether the position of the track switch is called for to be respectively normal or reverse. This is accomplished by the application of energy through front contact 138 or 139 of the relay 4LC in accordance with the contact 140 of the switch lever 4SML being respectively in its left-hand or right-hand position.

It will be obvious from the circuit organization that has been described for the application of energy to the respective channel wires 132, 133, 134, and 136 or 137, that this energy is applied simultaneously to all wires corresponding to steps during which marks are to be transmitted upon the picking up of relay 4LC at the beginning of the cycle of operation. At the beginning of the cycle of operation, however, these channel wires are isolated circuitwise from the windings of the code transmitter relay C, and it will be readily understood as the description progresses that energy from these respective wires is applied during the respective steps of the stepping relay bank selectively to the lower winding of the relay C in turn so as to pulse the relay C in accordance with the respective marks and spaces of the code selected for transmission.

After the control cycle has been initiated as has been heretofore described, the closure of the contact fingers 46 and 47 of the oscillator CT when the oscillator pendulum 388 rotates through center for the first time, closes a pickup circuit for the relay C for the transmission of the first character which is always a mark for transmission from the control office. The circuit by which the relay C is energized under these conditions extends from (+), including front contact 141 of relay 4V, front contact 142 of relay 2V, front contact 143 of relay LCS, contact fingers 46 and 47 of the oscillator CT, lower winding of relay C, and front contact 65 of relay LCS, to (—). Upon the picking up of relay C by the energization of this circuit, the closure of front contact 90 applies energy to the line circuit comprising the line wires 88 and 89 extending to the field location to accomplish the transmission of a mark during the first step of the communication system. The line circuit is closed at this time from the positive terminal of the battery LB through front contact 90 of relay C, front contact 144 of relay LCS, winding of relay L, wire 89, winding of relay L1, front contact 92 of relay C1, and wire 88 to the negative terminal of the line battery LB.

Upon the dropping away of the first step relay 1V, a circuit is conditioned for the transmission of a mark during the second step so that upon the rotation of the oscillator pendulum 388 through its center position for the last half of the first excursion of the pendulum, the closure of contact fingers 42 and 43 can establish a circuit for relay C to govern the transmission of a mark during the second step of the code communication system. Thus, if a mark is to be transmitted during the second step, energy is applied from the channel wire 132 through front contact 144*a* of relay 4V, front contact 145 of relay 3V, back contact 146 of relay 1V, front contact 147 of relay LCS, contact fingers 42 and 43 of the oscillator CT, lower winding of relay C, and front contact 65 of relay LCS, to (—). Should it be selected that a space is to be transmitted during the second step, there would be no energy applied to the channel wire 132, and therefore the relay C would be deenergized during the time period assigned for transmission during the second step of the code communication system to thereby form a space for that character in accordance with the line circuit being opened by the front contact 90 of relay C.

Similarly, energy is applied from the respective odd numbered channel wires through the contact fingers 46 and 47 of the oscillator CT for the energization of the code transmitter relay C for each of the respective successive odd steps, and the energization of the lower winding of relay C is accomplished in a similar manner for the even steps by a circuit selected through the contact fingers 42 and 43 of the oscillator CT.

It will be noted that during the time for transmission of the character during the second step, the circuit for the control of the relay C that has been described for transmission during the first step is opened by the opening of contact fingers 46 and 47 of the oscillator CT, and prior to the closure of these contact fingers again, the relay 2V becomes dropped away so as to open the circuit that has been described for the energization of relay C for transmission during the first step at front contact 142. Thus by a similar mode of operation, a new control circuit is selected by contacts of the stepper relays V for each successive character to be transmitted, and the circuit for the prior time interval of the cycle for the control of relay C is opened so that the relay C can be energized for the transmission of a mark only by the feeding of energy from the channel wire corresponding to the channel step of the communication system being taken at that time. The relay C can be picked up for the transmission of a mark during the third step of a code in accordance with energy feeding from the channel wire 133 through front contact 148 of relay 4V, back contact 142 of relay 2V, front contact 143 of relay LCS, contact fingers 46 and 47 of oscillator CT, lower winding of relay C, and front contact 65 of relay LCS, to (—).

The transmission of a mark during the fourth step of a cycle can be accomplished in accordance with the application of energy from channel wire 134 through back contact 149 of relay 3V, front contact 150 of relay 1V, front contact 147 of relay LCS, contact fingers 42 and 43 of oscillator CT, lower winding of relay C and front contact 65 of relay LCS.

A mark can be transmitted during the fifth step in accordance with the energization of relay C from the channel wire 135 through back contact 151 of relay 4V, front contact 152 of relay 2V, front contact 143 of relay LCS, contact fingers 46 and 47 of oscillator CT, lower winding of relay C, and front contact 65 of relay LCS.

A mark can be transmitted during the sixth step in accordance with energy applied to the channel wire 136 and feeding through back contact 153 of relay 4V, front contact 154 of relay 3V, back contact 150 of relay 1V, front contact 147 of relay LCS, contact fingers 42 and 43 of oscillator CT, lower winding of relay C and front contact 65 of relay LCS.

Relay C can be picked up for the transmission of a mark during the seventh step in accordance with energy feeding from the channel wire 137 through back contact 155 of relay 4V, back contact 152 of relay 2V, front contact 143 of relay LCS, contact fingers 46 and 47 of the oscillator CT, lower winding of relay C, and front contact 65 of relay LCS, to (—).

It will be noted from the description as it has been set forth relative to the operation of the relay C for the transmission of marks, that the duration of each mark is in accordance with the time of closure of the respective pairs of contact fingers of the oscillator CT. That is, the closure of a pair of contact fingers 46 and 47, or 42 and 43 of the oscillator CT is effective to energize the code transmitter relay C to initiate the transmission of a mark code character, and the opening of these contact fingers is effective by the deenergization of the relay C to terminate the transmission of the mark.

Figure 5A:
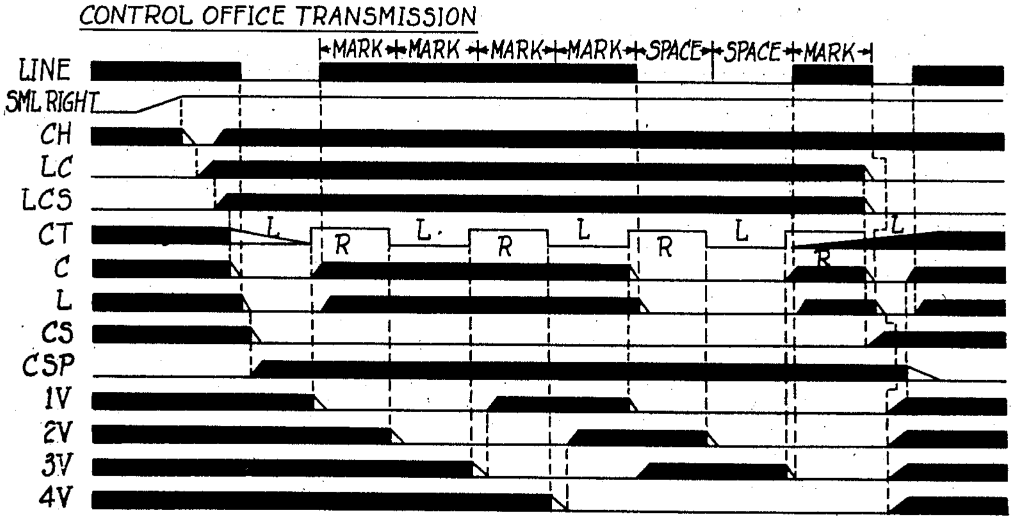
Figs. 5A and 5B are sequence charts illustrating approximate relative times of energization of the line circuit and respective code communication relays that can be obtained during a typical cycle of operation of the communication system for the transmission of a specific switch control code from the control office to the field station.
Figure 5B:
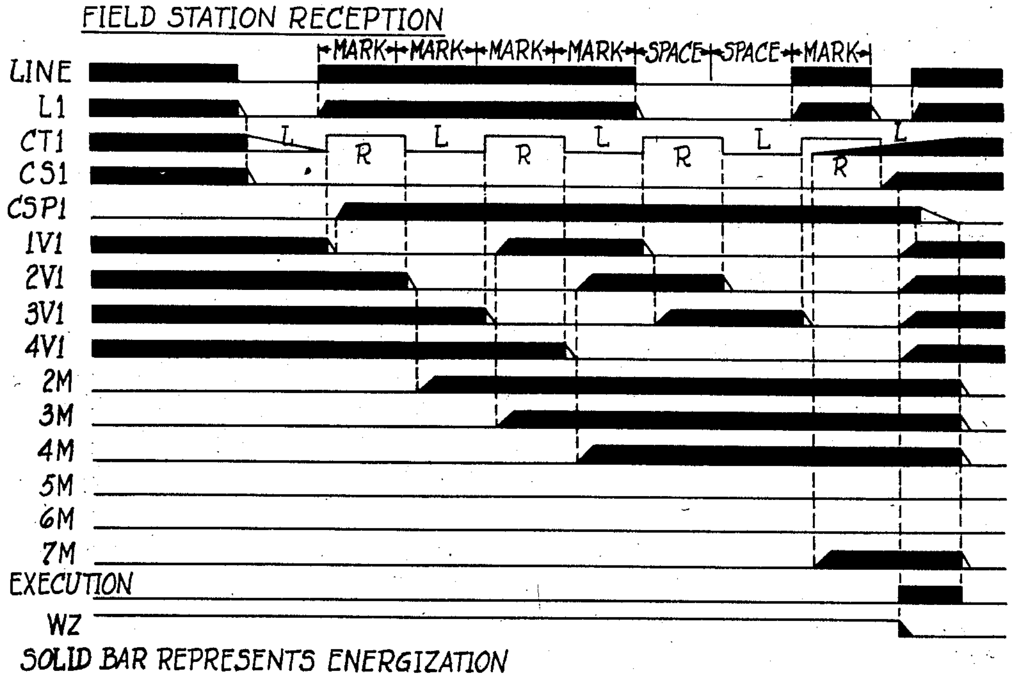
Figure 6A:
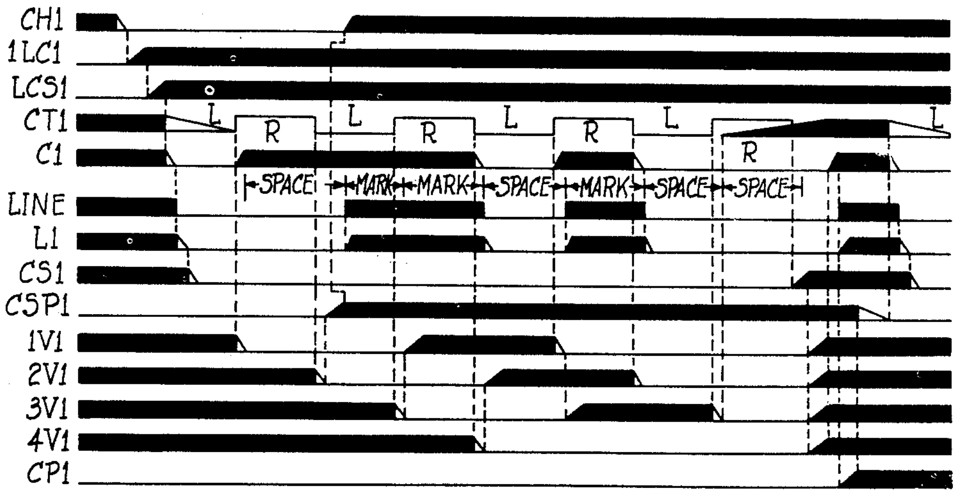

It has been pointed out that there is no appreciable time consumed in the shifting from one time period to the next as determined by the respective pairs of contact fingers on the oscillator CT, and it is illustrated according to the time charts of Figs. 5A and 5B that the contact fingers of the oscillator CT are so adjusted as to close one set of contact fingers at substantially the same time as the other contact fingers are opened as the oscillator pendulum 388 rotates through its center position. Thus it can be said that for practical purposes, there is substantially no time interval between the respective code characters that are transmitted over the line circuit, and when successive marks are transmitted, the oscillator pendulum 388 in passing through its center position shifts practically instantaneously from one energized circuit for the relay C to another, so that the code transmitter relay C never has a chance to be dropped away to open its front contact 90 in the line circuit so long as successive marks are transmitted during the transmission of a code.

*Reception of controls*

With reference to Fig. 1B, the line relay L1 is indicative during the respective steps of a control cycle as to whether the respective characters transmitted are marks or spaces. Thus a mark relay M is picked up for each step (except the first) in response to the actuation of the corresponding stepping relay, provided that the line relay L1 is picked up at this time to register that a mark is being received over the line circuit.

It is therefore provided that upon the dropping away of the second step relay 2V1, the relay 2M is picked up, provided that the line circuit is energized at this time. The pickup circuit for the relay 2M extends from (+), including front contact 156 of relay L1, back contact 157 of relay LCS1, contact fingers 42 and 43 of oscillator CT1, back contact 158 of relay LCS1, back contact 159 of relay 1V1, back contact 160 of relay 2V1, front contact 161 of relay 4V1, and lower winding of relay 2M, to (—). The relay 2M when picked up is maintained energized until after the execution period at the end of the cycle by a stick circuit including front contact 162 of relay CSP1 and front contact 163 of relay 2M. The relay CSP1 has been picked up in response to the dropping away of relay 1V1 during the first step by the energization of a circuit extending from (+), including front contact 156 of relay L1, back contact 157 of relay LCS contact fingers 46 and 47 of oscillator CT1, back contact 164 of relay LCS1, back contact 165 of relay 1V1, front contact 166 of relay 2V1, front contact 167 of relay 4V1, back contact 168 of relay LCS1, and lower winding of relay CSP1, to (—). It will be noted that the relay CSP1 can be picked up by the pickup circuit just described only provided that the front contact 156 of the line relay L1 is closed. This is a requisite for the reception of a control cycle to be hereinafter more specifically considered with reference to the interlock between simultaneous starts of the control office and field station transmitting apparatus.

Relay CSP1 when picked up is maintained energized for the balance of the control cycle by the energization of one or the other of several stick circuits which are about to be described. With the stepping relay 1V1 in its dropped away position, the lower winding of relay CSP1 is energized by a circuit extending from (+), including back contact 169 of relay 1V1, front contact 170 of relay CSP1, back contact 171 of relay LCS1, and lower winding of relay CSP1, to (—). With the relay 3V1 in its dropped away position, stick circuit energy is applied to the lower winding of relay CSP1 through a circuit extending from (+), including back contact 172 of relay 3V1, front contact 170 of relay CSP1, back contact 171 of relay LCS1 and lower winding of relay CSP1, to (—). Another stick circuit for the relay CSP1 extends from (+) including front contact 173 of relay 4V1, back contact 174 of relay L1, front contact 170 of relay CSP1, back contact 171 of relay LCS1 and lower winding of relay CSP1, to (—). This last described stick circuit is used to maintain the relay CSP1 picked up for a short time subsequent to the picking up of the stepping relays at the end of the cycle so as to prolong the execution period as is indicated in the sequence chart of Fig. 5B.

Upon the dropping away of the relay 3V1 to mark the beginning of the third time period in the reception of a code at the field location, the relay 3M is picked up, if a mark is received during this time period. The circuit for the energization of relay 3M extends from (+) including front contact 156 of relay L1, back contact 157 of relay LCS1, contact fingers 46 and 47 of oscillator CT1, back contact 164 of relay LCS1, back contact 175 of relay 2V1, back contact 176 of relay 3V1, front contact 177 of relay 4V1, and lower winding of relay 3M, to (—). Relay 3M is maintained picked up by a stick circuit including front contacts 178 and 179 of relay CSP1 and 3M respectively.

Upon the dropping away of relay 4V1 to mark the beginning of the fourth time period in the reception of a code at the field location, the relay 4M is picked up, if a mark is received during this time period. The circuit for the energization of relay 4M extends from (+), including front contact 156 of relay L1, back contact 157 of relay LCS1, contact fingers 42 and 43 of oscillator CT1, back contact 158 of relay LCS1, front contact 159 of relay 1V1, back contact 180 of relay 4V1 and lower winding of relay 4M, to (—). The relay 4M is maintained picked up by a stick circuit including front contacts 162 and 181 of relays CSP1 and 4M respectively.

If the line circuit is energized at the time when the fifth step is taken, the relay 5M is picked up. The pickup circuit for the relay 5M extends from (+), including front contact 156 of relay L1, back contact 157 of relay LCS1, contact fingers 46 and 47 of oscillator CT1, back contact 164 of relay LCS1, back contact 165 of relay 1V1, front contact 166 of relay 2V1, back contact 167 of relay 4V1, and lower winding of relay 5M, to (—). Relay 5M when picked up is maintained energized until the end of the execution period through front contacts 178 and 182 of relays CSP1 and 5M respectively.

Relay 6M can be picked up during the sixth step, if the line circuit is energized, in accordance with the energization of a circuit extending from (+), including front contact 156 of relay L1, back contact 157 of relay LCS1, contact fingers 42 and 43 of oscillator CT1, back contact 158 of relay LCS1, back contact 159 of relay 1V1, back contact 160 of relay 2V1, back contact 161 of relay 4V1, front contact 183 of relay 3V1 and lower winding of relay 6M, to (—). Relay 6M when picked up is maintained energized by a stick circuit extending through front contacts 162 and 184 of relays CSP1 and 6M respectively.

If a mark is received on the seventh step, the relay 7M is picked up upon the dropping away of the relay 3V1 for the second time to form the seventh step. The circuit for the energization of relay 7M extends from (+), including front contact 156 of relay L1, back contact 157 of relay LCS1, contact fingers 46 and 47 of oscillator CT1, back contact 164 of relay LCS1, back contact 175 of relay 2V1, back contact 176 of relay 3V1, back contact 177 of relay 4V1, and lower winding of relay 7M, to (—). Relay 7M when picked up is maintained energized through front contacts 178 and 185 of relays CSP1 and 7M respectively.

To consider the execution of a particular code, it will be assumed that the code "mark-mark-mark-space-space-mark" has been transmitted for the power operation of the track switch 4W to its reverse position in addition to the transmission of a mark during the first step. The reception of this code causes the energization as has been described of the decoding relays 2M, 3M, 4M, and 7M. The beginning of the execution period is defined by the picking up of the relay CS1, this relay being picked up in response to the passage of the rotating mechanism of the oscillator CT1 through center for the last time during the cycle of operation. Thus the relay CS1 is picked up at this time by the energization of a circuit extending from (+), including contact fingers 41 and 45 of oscillator CT1, back contact 186 of relay 1V1, back contact 187 of relay 3V1, back contact 188 of relay 2V1, and upper winding of relay CS1, to (—). Relay CS1 when picked up is maintained energized for the duration of the execution period by a stick circuit including front contact 189 of relay CSP1 and front contact 190 of relay CS1.

With the relays CS1 and CSP1 both picked up, an execution circuit is closed, and if the above described code has been received, the switch control relay 4WZ is energized with a polarity to actuate its contacts 191 and 192 to their dropped away positions so as to apply the proper polarity to the switch machine 4SM to operate the track switch 4W to its reverse position. The circuit for the energization of the relay 4WZ extends from (+), including back contact 193 of relay LCS1, front contact 194 of relay CS1, front contact 195 of relay CSP1, back contact 196 of relay CP1, front contact 197 of relay 2M, front contact 198 of relay 3M, front contact 199 of relay 4M, back contact 200 of relay 5M, back contact 201 of relay 6M, front contact 202 of relay 7M, wire 210, front contacts 203, 204, and 205 of relays 2M, 3M, and 4M, respectively, back contacts 206 and 207 of relays 5M and 6M, respectively, front contact 208 of relay 7M, front contact 209 of relay 4WZ and upper winding of relay 4WZ, to (—).

It will be noted that the code under consideration for reception has an even number of marks (not including the mark transmitted during the first step), and in accordance with the circuit organization for providing a parity check, the code received meets the requirements of the check by comprising an even number of marks. If, for some reason, one of these marks should not have been received, the above described execution circuit for the relay 4WZ could not have been closed Thus, for example, if the relay 7M had not been picked up for the last mark, the failure of front contact 202 of relay 7M to be closed would have prevented the feeding of energy to any application relay. It will be found that a similar condition is true if any one of the other marks should have not been received at the field location. Thus, if the relay 4M, for example, had not been picked up, the execution circuit would have been opened at back contact 202 of relay 7M to prevent the energization of the relay 4WZ, or the energization of any other application relay. It is believed that it should be readily apparent that the circuit organization is such that a code comprising any odd number of marks (not counting the mark transmitted during the first step) cannot be executed. It will be noted that the output wire 210 of the parity check portion of the execution circuits feeds all of the control relays that may be selectively governed by the reception of the respective control codes, and thus this condition that has been described with respect to the control of the execution for the switch control relay 4WZ is similarly effective for the control of the operation of other application control relays so that an even number of marks is required to be present in the code in order that the code may be effective for the control of an application relay. Thus, the parity check can be effective in a large number of cases to prevent the execution of a garbled code, and by so doing prevent the erroneous control of a switch or signal.

If the code that is received at the field location is for the control of a signal, the same general mode of operation is involved in the energization of the associated signal application relay GZ. For example, if the code received is for the clearing of an eastbound signal 2 (traffic to the right), the relay 2RGZ is picked up during the execution period after reception of a code having the characters "space-mark-space-space-mark-space" (in addition to the mark transmitted during the first step). This code is transmitted from the office when relay 2—3LC is picked up, and lever 2—3SGL is in its right-hand position (see Fig. 1A). Upon the reception of this code at the field location, the relays 3M and 6M are picked up, and thus the relay RGZ is picked up during the execution period. The circuit for the energization of relay RGZ (see Fig. 1B) extends from (+), including back contact 193 of relay LCS1, front contact 194 of relay CS1, front contact 195 of relay CSP1, back contact 196 of relay CP1, back contact 197 of relay 2M, front contact 211 of relay 3M, back contact 212 of relay 4M, back contact 200 of relay 5M, front contact 201 of relay 6M, back contact 202 of relay 7M, wire 210, back contact 203 of relay 2M, front contact 213 of relay 3M, back contact 214 of relay 4M, back contact 215 of relay 5M, front contact 216 of relay 6M, back contact 217 of relay 7M, and upper winding of relay RGZ, to (—). When picked up, the relay RGZ is maintained energized by a stick circuit (not shown) for its lower winding which is provided in the usual manner for the control of stick signals so that the relay RGZ can be dropped away when a train accepts its associated signal, or when the stop control relay B is picked up by a signal stop control transmitted from the control office. Relay RGZ when picked up applies energy through its front contact 218 to permit the clearing of either the upper or lower arm of signal 2 as selected by the track switch 4W in accordance with the usual practice. This usual system of signal control is assumed to be provided in the portion of the signal control indicated by the dotted lines extending to the signals, and also it is to be understood that suitable track circuit control, and control in accordance with the condition of the signal in advance is included in accordance with the usual practice.

It is believed that it should be readily apparent from the description that has been set forth that a similar mode of operation is effective for the clearing of signal 3A or signal 3B for governing westbound traffic (to the left), and that the relay 2—3B can be similarly energized by a distinctive code selected for transmission by a signal control lever at the control office in its center position for putting a signal to stop.

*Control cycle termination*

The termination of the control cycle is initiated in response to the rotation of the oscillator CT (see Fig. 1A) through center for the last time during the cycle. This is with the oscillator CT rotating toward its locked up position. Energy is already applied to the winding of the oscillator CT at this time so as to terminate its operation by reason of a circuit being closed upon the dropping away of the relay 3V for the second time to form the last step. Thus the dropping away of the relay 3V closes an energizing circuit for the oscillator CT extending from (+), through back contact 115 of relay 4V, back contact 107 of relay 1V, back contact 108 of relay 2V, back contact 219 of relay 3V and winding of oscillator CT, to (—).

When the oscillator CT rotates through center for the last time during the cycle it opens the stick circuit that has been holding the relay LCS (and the relay LC that has been picked up) so as to cause these relays to be restored to their normally deenergized positions. Thus if it is assumed, for example, that the relay 4LC has been energized during the cycle for the transmission of a switch control for the track switch 4W as has been described, subsequent to all stepping relays becoming contemporaneously dropped away, the relays LCS and 4LC have been maintained picked up by a stick circuit extending from (+) including contact fingers 44 and 48 of oscillator CT, back contact 101 of relay 2V, back contact 114 of relay 4V, front contact 82 of relay LCS, winding of relay LCS, front contact 74 of relay 4LC and upper winding of relay 4LC, to (—). Thus the opening of the contact fingers 44 and 48 in this stick circuit causes the relays LCS and 4LC to become dropped away.

This same operation of the oscillator CT deenergizes the code transmitter relay C, if this relay has been picked up for transmission of a mark as the last character of the code. The circuit for the lower winding of relay C is opened by the opening of contact fingers 46 and 47 of the oscillator CT.

The closure of the contact fingers 41 and 45 of the oscillator CT when it rotates through its center position for the last time establishes a pickup circuit for the relay CS extending from (+), including contact fingers 41 and 45 of oscillator CT, back contact 98 of relay 1V, back contact 103 of relay 3V, back contact 220 of relay 2V and upper winding of relay CS, to (—). This relay when picked up closes front contact 91 in the line circuit, but the line circuit is still held open by reason of the relay C being dropped away to open front contact 90. Although the relay CS in picking up opens back contact 96 by which it has maintained the relay CSP energized, back contact 221 of relay 4V is closed at this time to maintain the relay CSP energized, and also the relay L is dropped away because of the opening of the line circuit by the front contact 90 of relay C, so that energy is also applied to the relay CSP through back contact 222 of relay L.

The picking up of relay C, with the relay CSP already in its picked up position provides pickup energy for the lower windings of the respective stepping relays, the relay 1V, for example, having its lower winding energized through front contact 223 of relay CS in series with front contact 224 of relay CSP. The relays 2V, 3V, and 4V are picked up by the energization of similar pickup circuits.

When the stepper relays have all been picked up, with the relay LCS in its dropped away position, a pickup circuit is closed for the relay C extending from (+), including front contact 225 of relay 4V, front contact 226 of relay 3V, front contact 227 of relay 2V, front contact 228 of relay 1V, upper winding of relay C, and back contact 65 of relay LCS, to (—). The picking up of this relay establishes a normally energized stick circuit that has been described as having energy applied at front contact 92 of relay C. Thus the control office has again applied energy to the line circuit, and the line relay L is picked up.

The relay CSP becomes dropped away because of having its circuit opened at back contact 221 upon the picking up of relay 4V, and the back contact 222 upon the picking up of the relay L. This relay is made to have slow drop away characteristics by reason of the shunting by the front contact 229 of the upper winding of the relay for purposes to be more readily apparent as the description of the invention progresses. Thus complete restoration to the normal conditions of the system is effected at the control office at the end of a typical control cycle.

To consider cycle termination at the field location for the same typical cycle of operation that has been considered for termination at the control office, the oscillator CT1 (see Fig. 1B) at the field location becomes energized upon the dropping away of the relay 3V1 to form the last step. The circuit for the energization of oscillator CT1 extends from (+), including back contact 230 of relay 4V1, back contact 231 of relay 1V1, back contact 232 of relay 2V1, back contact 233 of relay 3V1 and winding of oscillator CT1, to (−).

The stepping relays at the field location are picked up at the beginning of the execution period when the relay CS1 is picked up in response to the oscillator rotating through center for the last time as has been heretofore described. Thus with the relays CS1 and CSP1 both in their picked up positions, circuits are closed for the respective lower windings of the relays 1V1, 2V1, 3V1, and 4V1 comparable to the circuit provided for the lower winding of relay 1V1 extending from (+), including front contact 234 of relay CS1, front contact 235 of relay CSP1, and lower winding of relay 1V1, to (−). These stepping relays when picked up deenergize the relay CSP1 by the opening of respective stick circuits closed at back contacts 169, 172*a*, and 172 of relays 1V1, 2V1, and 3V1, respectively. Thus the relay CSP1 is dropped away after a time interval dependent upon the shunting of its upper winding by the contact 237. Relay CS1 is maintained picked up, however, subsequent to the opening of front contact 189 of relay CSP1 by its normally energized stick circuit through front contact 97 of the line relay L1 which has become energized at this time as is indicated in the sequence charts of Figs. 5A and 5B.

After the relay CSP1 has had time to become dropped away, the opening of its front contacts 178 and 162 removes stick energy from the odd and even mark decoding relays M respectively so as to cause these relays to become dropped away and thus complete restoration to the normal conditions for the code communication apparatus at the field location.

*Transmission of indications*

Because of this being a simplex system, the same stepping and oscillator timing devices are used for the communication of indications as for the communication of controls. Thus it is believed unnecessary to consider specifically the mode of operation of the stepping, and for a consideration of the mode of operation during an indication cycle, specific reference will be more particularly made to those circuits and functions which are different from circuits and functions that have been heretofore described.

Figure 1D:
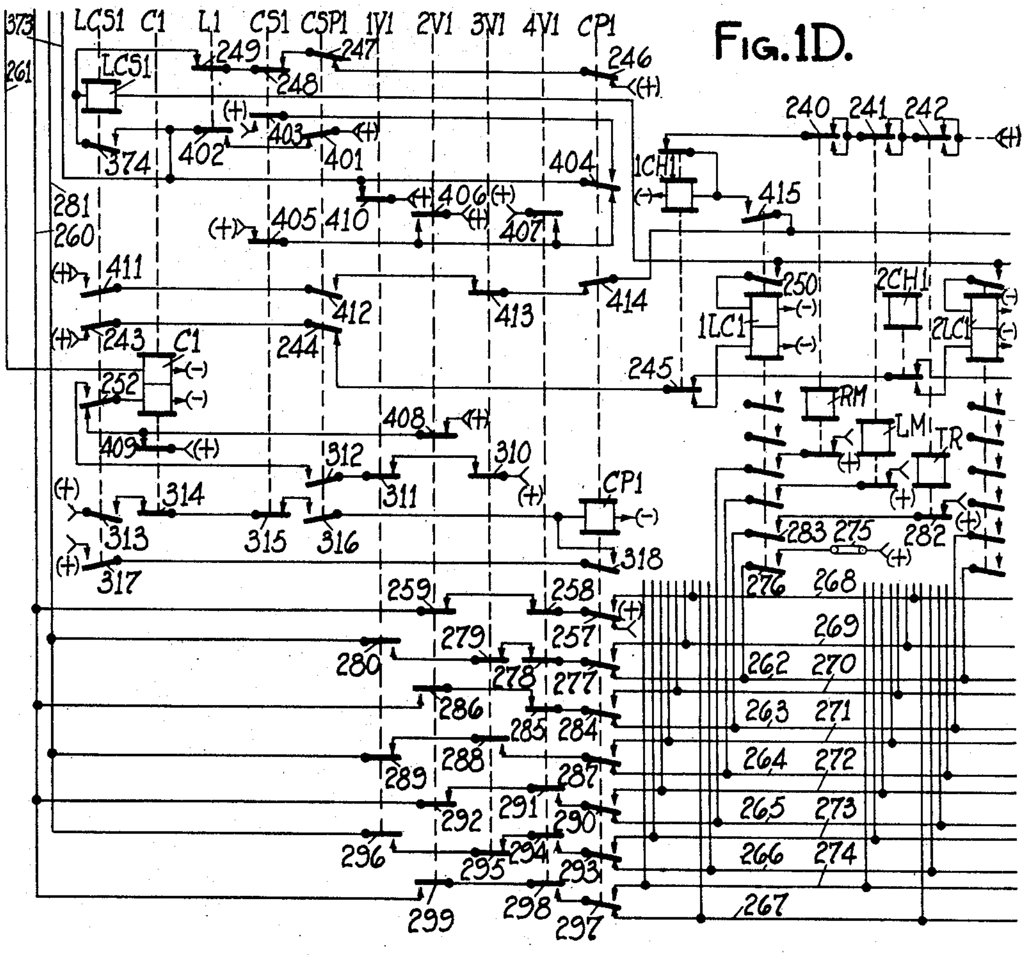

For the embodiment of the invention disclosed in Figs. 1A to 1D inclusive, it is assumed that there are more indications to be transmitted from the single field location to the control office than can be transmitted during any one indication communication cycle of operation of the communication system. Thus it is assumed that the indications are divided into a plurality of groups, each group comprising a number of distinctive indications that can be communicated during a single indication cycle of operation. Each of these groups of indications has associated therewith a relay LC1 (see Fig. 1D) and a change relay CH1 which acts to initiate the communication system into a cycle of operation when there are indications to be transmitted in much the same manner as has been described by which the corresponding relays are used at the control office for initiating the system into respective cycles of operation for the transmission of controls that have been designated. The relays LC1 at the field location are connected in a chain circuit organization comparable to that which is shown in Fig. 1A for the relay LC for the transmission of controls, and the relay LCS1 of Fig. 1D is comparable to the relay LCS (see Fig. 1A) which is used at the control office in connection with the transmission of controls. By this chain circuit organization, only one relay LC1 can be picked up at a time, and any one relay LC1 when picked up is maintained energized throughout the cycle of operation for the communication of indications, and the code characters transmitted during the indication cycle are selected through front contacts of the particular relay LC1 that is picked up at that time, energy being applied or not through these respective front contacts in accordance with the condition of the particular device that is to be indicated.

Because there are generally a larger number of indications to be communicated than controls, the system is so organized that when used for the communication of indications a complete repeat of the stepping operations is effective during each indication communication cycle so that 14 communication channels are formed rather than the seven channels used during a control cycle. At the field station, the relay CP is picked up upon completion of transmission of the first half of the indication cycle, and this relay when picked up initiates the second half of the indication cycle and also causes the picking up of its repeater relay CPP to select a second group of channel wires for connection through circuit selections of the stepping relays to the code transmitter relay C1.

The first communication channel during an indication cycle is used for lockout purposes as will be hereinafter considered, and although the relay C1 is always picked up for transmission during the period associated with this first channel, the line circuit is maintained open during this period at the control office. The next character or group of characters transmitted during an indication cycle is indicative of the particular indication station registration code for identifying at the control office the particular indication station that is transmitting indications during that particular indication communication cycle. For simplification of an understanding of the mode of operation of the system according to the present invention, only one character is used for station registration purposes to identify which one of the two indication stations having the relays 1LC1 and 2LC1 respectively is transmitting its indications. The following characters are respectively marks or spaces in accordance with the condition of the devices to have their positions indicated for the respective steps taken during the indication cycle.

More specifically, to consider the transmission during an indication cycle which is initiated when the system is at rest, it will be assumed that the relay 1CH1 is dropped away because of the opening of its stick circuit by the shifting of any one of the three contacts 240, 241, or 242 of the relays RM, LM, or TR respectively. The dropping away of relay 1CH1 closes a pickup circuit for the lower winding of relay 1LC1 through back contact 243 of relay LCS1, back contact 244 of relay CSP and back contact 245 of relay 1CH1. Relay 1LC1 when picked up is maintained energized by a stick circuit for its upper winding including the winding of relay LCS1. This circuit extends from (+), including back contact 246 of relay CP1, back contact 247 of relay CSP1, front contact 248 of relay CS1, front contact 249 of relay L1, winding of relay LCS1, front contact 250 of relay 1LC1, and upper winding of relay 1LC1, to (—).

The picking up of relay LCS1 causes the deenergization of the oscillator CT1 by the opening of its circuit at back contact 251 (see Fig. 1B) and the initiation of this oscillator initiates the operation of the stepping which takes place by circuit means that has been heretofore described.

The picking up of the relay LCS1 at the field station is also effective to cause the dropping away of the code transmitter relay C1 (see Fig. 1D) by the opening of an obvious stick circuit at back contact 252 by which the relay C1 has had its lower winding normally energized. The dropping away of the relay C1 causes the dropping away of the line relay L at the control office by the opening of the line circuit at front contact 92. Relay L at the control office when dropped away initiates the operation of the oscillator CT and thus starts the stepping operation because of the opening of front contact 77 in the normally energized circuit for the oscillator CT.

The dropping away of the line relay L1 at the field location because of the opening of the line circuit causes the deenergization of the relay CS1 by the opening of its stick circuit at front contact 97. Similarly, at the control office, the dropping away of relay L causes the dropping away of relay CS by the opening of its stick circuit at front contact 94, and the dropping away of relay CS at the control office closes a pickup circuit for the relay CP. The circuit for relay CP extends from (+), including back contact 253 of relay LCS, back contact 254 of relay CS, front contact 255 of relay 4V, lower winding of relay CP, and back contact 256 of relay CPP, to (—). The dropping away of the relay L at the control office has also caused the picking up of the relay CSP (see Fig. 1A) by the energization of an obvious circuit closed at back contact 222. Thus the indication cycle has been initiated, and although the relay C1 (see Fig. 1C) is picked up at the field station in response to the dropping away of the first stepper relay 1V1, the line relays L1 and L, at the field station and the control office respectively remain deenergized because the line circuit is held open at the control office by reason of the relay CS (see Fig. 1A) being dropped away to open the normally closed contact 91 in the line circuit. The circuit for the energization of the relay C1 in response to the rotation of the oscillator pendulum through center for the first time, extends from (+), including back contact 257 (see Fig. 1D) of relay CP1, front contact 258 of relay 4V1, front contact 259 of relay 2V1, wire 260, front contact 164 of relay LCS1, contact fingers 46 and 47 of oscillator CT1, front contact 157 of relay LCS1, wire 261 and upper winding of relay C1, to (—). When the oscillator next opens the contact fingers 46 and 47, the circuit that has been described for the relay C1 is opened, but if it is determined that the next character to be transmitted is a mark, a new circuit is immediately established through the contact fingers 42 and 43 to maintain the relay C1 energized. The opening of the contact fingers 46 and 47 of the oscillator CT1 causes the dropping away of the second stepping relay 2V1, and the dropping away of this relay opens the circuit that has been described for the relay C1 at front contact 259 so that, in combination with front contact 258 of relay 4V, it is provided that the circuit which has been described for initial energization of the relay C1 cannot again be established during the first half of the indication cycle.

It has been pointed out that the order of transmission is that the next character or characters be used for station registration, and thus the next character transmitted for this embodiment of the present invention is a mark or a space, dependent upon whether it is the indication station associated with relay 1LC1 (see Fig. 1D) or with relay 2LC1 that is transmitting. More specifically, if energy is applied by the code jumper 275 through front contact 276 of relay 1LC1 to the channel wire 262, it is determined that a mark is to be transmitted during the second channel of the indication cycle. Under these conditions, the relay C1 is energized during the last half of the first excursion of the oscillator pendulum by a circuit extending from (+), including code jumper 275, front contact 276 of relay 1LC1, wire 262, back contact 277 of relay CP1, front contact 278 of relay 4V1, front contact 279 of relay 3V1, back contact 280 of relay 1V1, wire 281, front contact 158 of relay LCS1, contact fingers 42 and 43 of oscillator CT1, front contact 157 of relay LCS1, wire 261, and upper winding of relay C1, to (—).

The energization of relay C1 by the circuit just described is maintained until the opening of the contact fingers 42 and 43 for the second time during the indication cycle, at which time the relay C1 is dropped away unless it is provided that the next character to be transmitted is also a mark. At this time the relay 3V1 is dropped away and the dropping away of this relay opens the circuit that has been described for the energization of the relay C1 at front contact 279 to prevent subsequent energization of this channel circuit during the first half of the indication cycle.

If the track relay TR (see Fig. 1D) is picked up so as to close its front contact 282 during an indication cycle when relay 1LC1 is picked up, energy is applied through front contact 283 of relay 1LC1 to the channel wire 263 to energize the relay C1 for the third channel to cause the transmission of a mark. The circuit by which relay C1 is energized under these conditions extends from (+), including front contact 282 of relay TR, front contact 283 of relay 1LC1, wire 263, back contact 284 of relay CP1, front contact 285 of relay 4V1, back contact 286 of relay 2V1, wire 260, front contact 164 of relay LCS1, contact fingers 46 and 47 of oscillator CT1, front contact 157 of relay LCS1, wire 261, and upper winding of relay C1, to (—). The circuit that has just been described for relay C1 is opened when the oscillator pendulum rotates through center to open contact fingers 46 and 47 for the second time during the indication cycle. The opening of front contact 285 (see Fig. 1D) of relay 4V1 at this time prevents the energization of the circuit that has just been described for the relay C1 from becoming effective again during the first half of the indication cycle.

Thus, in a similar manner, as the transmission progresses, the fourth character is transmitted as a mark or a space in accordance with the condition of the indication relay LM so as to govern the energization of the channel wire 264. If energy is applied to this channel wire, the relay C1 can be energized for the transmission of a mark as the fourth character through back contact 287 of relay CP1, back contact 288 of relay 3V1, front contact 289 of relay 1V1, wire 281, front contact 158 of relay LCS1, contact fingers 42 and 43 of oscillator CT1, front contact 157 of relay LCS1, and wire 261. The combination of front contact 289 of relay 1V1 and back contact 288 of relay 3V1 provides that this channel is maintained open except for the particular condition of energization that has been considered.

If energy is applied to the channel wire 265 for the transmission of a mark as the fifth character during an indication cycle, the relay C1 is energized for the fifth character through back contact 290 of relay CP1, back contact 291 of relay 4V1, front contact 292 of relay 2V1, wire 260, front contact 164 of relay LCS1, contact fingers 46 and 47, front contact 157 of relay LCS1, and wire 261. The contacts 291 and 292 of relays 4V1 and 2V1 provide that this channel of communication is closed for the energization of relay C1 only during the period that has been specified.

For the transmission of the sixth character, the relay C1 can be energized for the transmission of a mark if energy is applied to the wire 266 and through back contact 293 of relay CP1, back contact 294 of relay 4V1, front contact 295 of relay 3V1, back contact 296 of relay 1V1, wire 281, front contact 158 of relay LCS1, contact fingers 42 and 43 of oscillator CT, front contact 157 of relay LCS1, and wire 261. The stepping contacts 294, 295, and 296 in this circuit provide for the closure of the circuit for the transmission of the sixth character of the code only.

If a mark is to be transmitted as the seventh character, energy is applied to the channel wire 267 and through a circuit for relay C1 including back contact 297 of relay CP1, back contact 298 of relay 4V1, back contact 299 of relay 2V1, wire 260, front contact 164 of relay LCS1, contact fingers 46 and 47 of oscillator CT1, front contact 157 of relay LCS1 and wire 261.

Also, during the seventh step, the oscillator CT1 (see Fig. 1B) is energized upon the dropping away of the stepping relay 3V1 by a circuit extending from (+), including back contact 230 of relay 4V1, back contact 231 of relay 1V1, back contact 232 of relay 2V1, back contact 233 of relay 3V1, and winding of oscillator CT1, to (−). This energization provides that the oscillator CT1 is momentarily actuated against its stops at the mid-point in the cycle as is indicated in the indication cycle sequence chart of Fig. 6A.

When the oscillator pendulum rotates through center for the last time during the first half of the indication cycle, the relay CS1 (see Fig. 1B) is picked up for a brief interval by the energization of a circuit extending from (+), including contact fingers 41 and 45 of oscillator CT1, back contact 186 of relay 1V1, back contact 187 of relay 3V1, back contact 188 of relay 2V1, and upper winding of relay CS1, to (−). This relay when picked up is maintained energized by its stick circuit through front contact 189 of relay CSP1 for the time interval during which the stepping relays are being picked up and the line circuit is being closed.

Upon the picking up of relay CS1, the stepping relays are simultaneously picked up by the energization of circuits which have been heretofore considered, and the picking up of the stepping relays causes the picking up of relay C1 to close the line circuit. With reference to Fig. 1D, the circuit for the energization of relay C1 at this time extends from (+), including front contact 310 of relay 3V1, front contact 311 of relay 1V1, front contact 312 of relay CSP1, front contact 252 of relay LCS1, and lower winding of relay C1, to (−). Relay C1 in picking up closes the line circuit at front contact 92. Thus the line relay L1 at the field station is picked up in response to the picking up of relay C1 because the line circuit at the control office is closed at this time as will be hereinafter considered when considering specifically the mode of operation for the reception of indications at the control office.

Relay CP1 (see Fig. 1D) is picked up at the field station at the mid-point in the indication cycle upon the picking up of the relay C1 in accordance with the energization of a circuit extending from (+), including front contact 313 of relay LCS1, front contact 314 of relay C1, front contact 315 of relay CS1, front contact 316 of relay CSP1, and winding of relay CP1, to (−). This relay when picked up is maintained energized by a stick circuit including front contact 317 of relay LCS1, and front contact 318 of relay CP1, until the end of the cycle.

The relay CSP1 is deenergized upon the picking up of relay CP1 because of the opening of a stick circuit by which the relay CSP1 is being held up at this time. This stick circuit has been closed upon the picking up of relay CS1 and extends from (+), including back contact 319 of relay CP1, front contact 320 of relay CSP1, front contact 321 of relay CS1, front contact 171 of relay LCS1, and lower winding of relay CSP1, to (−). Because of the upper winding of relay CSP1 being shunted through front contact 237, the dropping away of this relay is slow as is indicated in the timing chart of Fig. 6A.

The dropping away of relay CSP1 actually initiates the second half of the indication cycle transmission from the field station by the deenergization of the oscillator CT1. This is accomplished by the opening of a circuit by which the oscillator has become energized upon the picking up of relay CS1. This circuit extends from (+), including front contact 322 of relay CS1, front contact 323 of relay CSP1, and winding of oscillator CT1, to (−). Relay C1 is also deenergized by the dropping away of relay CSP1 because of the opening of its circuit at front contact 312 (see Fig. 1D).

The dropping away of relay C1 opens the line circuit by opening its front contact 92 (see Fig. 1B), and thus causes the dropping away of the line relay L1 at the field station together with the dropping away of the line relay L at the control office. Upon the dropping away of the line relay L1 at the field station, the relay CS1 is dropped away because of the opening of its stick circuit at front contact 97 of relay L1, the front contact 189 of relay CSP1 having been opened upon the prior dropping away of relay CSP1.

Thus, the initiation of transmission during the second half of the indication cycle is accomplished, the first step being taken upon the dropping away of the relay 1V1 when the oscillator pendulum first rotates through center, and the transmission of selected marks and spaces being effective for the second half of the indication cycle in accordance with a mode of operation that has been heretofore described for transmission during the first half of the indication cycle. It will be noted that all seven steps of the second half of the indication cycle can be used for the transmission of respective distinctive indications, as there is no need for reserving the first character as in the first half of the cycle for interlocking purposes between field and office transmission. This is true because the relay LCS (see Fig. 1A) at the control office does not have a chance to be picked up at the midpoint in the cycle because either the relay CP or the relay CPP is picked up to open back contact 70 or 69, respectively.

*Reception of indications*

When an indication cycle is first initiated by the opening of the line circuit by the field station, the line relay L (see Fig. 7A) at the control office becomes dropped away, and the dropping away of this relay is effective to deenergize the oscillator CT and thus initiate the stepping in accordance with the opening of front contact 77. The line relay in dropping away also deenergized the relay CS by opening the normally energized stick circuit for this relay at front contact 94 so as to cause the relay CS to be dropped away. The line relay L in dropping away also causes the picking up of relay CSP by an obvious circuit closed at front contact 222.

The relay CP (see Fig. 1C) is picked up at the control office upon the dropping away of the relay CS, and this relay when picked up is maintained energized throughout the first half of the indication cycle, thus selecting the indication reception channels connected through its front contacts as being those that are used during the first half of the indication cycle, while the indication receiving channels connected through the back contacts of the relay CP are used during the second half of the indication cycle. The circuit for the energization of relay CP at this time extends from (+), including back contact 253 of relay LCS, back contact 254 of relay CS, front contact 255 of relay 4V1, lower winding of relay CP, and back contact 256 of relay CPP, to (−). This relay when picked up is maintained energized throughout the first half of the indication cycle by a stick circuit extending from (+), including front contact 324 of relay CSP, front contact 325 of relay CP, and upper winding of relay CP, to (−).

The picking up of relay CP completes the conditioning at the office for the reception of indications, except that the line circuit is maintained open at this time because it has been opened by the dropping away of relay CS (see Fig. 1A) and the opening of front contact 91. The opening of the line circuit during the first step of an indication cycle will be hereinafter more specifically considered when considering the interlock between control office and field station simultaneous starts, and for the purpose of consideration of the reception of indications under the assumed conditions, with no controls having been designated for transmission, the line circuit is maintained open at the control office until the dropping away of the relay 2V to initiate the second step in the operation of the system. Thus the dropping away of the relay 2V at the beginning of the second step closes the line circuit at back contact 326 and conditions the line relay L at the control office for the reception of the marks and spaces that are transmitted as indication codes from the field station. The back contact 237 of relay 4V, which is connected in multiple with back contact 326 of relay 2V, is to cover the interval during which relay 2V is picked up during the stepping for use the second time in forming a step.

It has been pointed out that in accordance with usual procedure, the indication station registration code is transmitted first, and then the following characters are used for identifying the positions of respective devices to be indicated. For simplification of the present invention, only two indication stations have been considered, and thus only a single character is used for station registration, and a mark or a space is applied to the line circuit during the second step as has been considered in accordance with whether the indications are transmitted for indication station No. 1 or indication station No. 2, respectively. Thus if a mark is received at the control office during the second step, relay 1ST is picked up, or if a space is received during the second step, relay 2ST is picked up.

If it is assumed that a mark is received during the second step, the line relay L (see Fig. 1A) is picked up at the control office at this time, and the relay EM (see Fig. 1C) is picked up because this relay responds on each even step during which the line circuit is energized. The circuit for the energization of relay EM during the second step extends from (+), including back contact 327 of relay LCS (see Fig. 1A), contact fingers 42 and 43 of oscillator CT, back contact 147 of relay LCS, wire 328, front contact 329 of relay L, front contact 330 of relay 3V, back contact 331 of relay 2V, and lower winding of relay EM, to (−).

Relay EM, when picked up during the second step, is maintained energized during the third step (during which the relay 1ST is picked up). The stick circuit by which the relay EM is energized at this time extends from (+), including back contact 327 of relay LCS (see Fig. 1A), contact fingers 46 and 47 of oscillator CT, back contact 143 of relay LCS, wire 332, front contact 333 of relay EM, and lower winding of relay EM, to (−). At this time the relay 1ST is energized by a circuit extending from (B+), including front contact 334 of relay EM, back contact 335 of relay LCS, front contact 336 of relay 4V, back contact 337 of relay 3V, front contact 338 of relay CP, front contact 339 of relay EM, and lower winding of relay 1ST, to (CN).

If the registration code had been a space for transmission during the second step for the selection of the relay 2ST rather than the relay 1ST, the relay EM would not have been picked up during the second step as has been described because its pickup circuit would have been open at front contact 329. Therefore at the time of execution of the character received during the second step (which takes place during the third step) the relay 2ST would have been picked up by the energization of a circuit extending from (B−), including back contact 334 of relay EM, back contact 335 of relay LCS, front contact 336 of relay 4V, back contact 337 of relay 3V, front contact 338 of relay CP, back contact 339 of relay EM, and lower winding of relay 2ST, to (CN).

It is therefore provided that if a mark is received during the second step, the relay 1ST is picked up, and the closure of its front contacts such as the contacts 340, 341, and 342 selects a particular group of magnetic stick indication relays to be controlled during the cycle, while if the relay 2ST is picked up, the closure of its front contacts including contacts 343, 344, and 345 selects a different group of magnetic stick relays (not shown) to be controlled during the reception of indications.

If, in practice, it is found that more than two indication stations are required, additional steps may be used for station registration purposes in accordance with the usual practice, or the station registration code may be decoded by the organization of station relays ST as provided in my co-pending application Ser. No. 240,088, filed August 3, 1951.

To consider further reception of indications according to the system as disclosed in Fig. 1, the reception of a mark during the third step is effective to cause the picking up of the odd mark relay OM. Relay OM can be energized at this time, if the line relay L is picked up, by a circuit extending from (+), including back contact 327 of relay LCS, contact fingers 46 and 47 of oscillator CT, back contact 143 of relay LCS, wire 332, front contact 346 of relay L, back contact 347 of relay 2V, front contact 348 of relay 4V, back contact 349 of relay 3V, and lower winding of relay OM, to (−).

This relay when picked up conditions the control of the indication relays so that a relay will be energized with positive energization during the next step in accordance with the closure of front contact 350. The relay OM is maintained energized during the fourth step by a stick circuit extending from (+), including back contact 327 of relay LCS (see Fig. 1A), contact fingers 42 and 43 of oscillator CT, back contact 147 of relay LCS, wire 328, front contact 351 of relay CSP, front contact 352 of relay OM, and lower winding of relay OM, to (−). It will be noted that the inclusion of front contact 351 of relay CSP in this circuit provides a means for opening the stick circuit at the end of the stepping operation when the oscillator contact fingers 42 and 43 are closed for the last time.

Upon entering the fourth step, the stick circuit for relay EM is opened by the opening of the contact fingers 46 and 47 of the oscillator CT, and thus the relay EM becomes dropped away unless the line relay L is picked up in accordance with a mark being received during the fourth step. The circuit for the energization of relay EM at this time extends from (+), including back contact 327 of relay LCS (see Fig. 1A), contact fingers 42 and 43 of oscillator CT, back contact 147 of relay LCS, wire 328, front contact 329 of relay L, back contact 330 of relay 3V, front contact 353 of relay 1V, back contact 354 of relay 4V, and lower winding of relay EM, to (−). Should the line relay L be dropped away at this time to open the front contact 329, the relay EM would become dropped away during the fourth step.

If it is assumed that the station relay 1ST has been picked up, and that a mark is received during the third step to pick up the relay OM as has been described, during the fourth step, the indication relay TK becomes energized with positive polarity by a circuit extending from (B+), including front contact 350 of relay OM, back contact 355 of relay LCS, back contact 356 of relay 4V, front contact 357 of relay 1V, front contact 358 of relay CP, front contact 340 of relay 1ST, and winding of relay TK, to (CN). According to the organization of the circuits as shown, this polarity of energization would be applied when it is desired to be indicated that the corresponding track section in the field is unoccupied, and thus it is provided that this polarity of energization of the relay TK is effective to cause the relay to be picked up. Inasmuch as it is assumed that this relay is normally in its picked up position, energization during the fourth step does not change its condition of its contacts. If, however, the third character had been received as a space, the relay OM would not have been picked up because of its circuit being open at front contact 346 of relay L, and therefore negative energization would have been applied to the circuit that has been described for the relay TK through back contact 350 of relay OM, so as to cause the relay TK to be actuated to its dropped away position as an indication of occupancy of the corresponding track section. This would energize the track indicator lamp TE through back contact 359 of relay TK.

Having thus specifically described the mode of operation of one magnetic stick relay at the control office in accordance with the reception of a mark or a space for its control during its assigned channel of communication, it is to be understood that a similar mode of operation is applicable to the control of other magnetic stick indication relays that have their indication code characters transmitted during odd steps of the indication cycle.

It has been considered as to how the even mark relay EM can be energized during the fourth step if the character received during that step is a mark, and in accordance with this energization, the relay EM is maintained picked up by a stick circuit during the fifth step that has been described, during which time the indication relay assigned to be controlled during the fourth step is energized with positive polarity. This relay in Fig. 1C is the magnetic stick relay LMK which indicates the condition of signals in the field governing traffic to the left (westbound traffic). Thus if a mark is received during the fourth step, the relay LMK is energized with positive polarity which actuates the relay to its picked up position if it is not already in that position. The circuit for the energization of relay LMK with positive polarity extends from (B+), including front contact 334 of relay EM, back contact 335 of relay LCS, back contact 336 of relay 4V, back contact 360 of relay 1V, front contact 361 of relay 2V, front contact 363 of relay CP, front contact 341 of relay 1ST, and winding of relay LMK, to (CN). If a space should be received for the control of this magnetic stick relay, the circuit just described will be energized with negative polarity at back contact 334 of relay EM so as to energize the relay LMK with a polarity to cause that relay to actuate its contacts to their dropped away positions and thus apply energy through back contact 364 of relay LMK to the indicator lamp LME to indicate that the westbound signal has been cleared.

The operation of the odd mark received relay OM is comparable to that which has been described for the relay EM for successive odd marks in that the relay is maintained picked up so long as successive odd marks are received, but is dropped away during any odd period during which a space is received Having described specific conditions relative to the reception of indications during typical steps of operation during an indication cycle, it should be readily apparent that the mode of operation described is readily applicable to the reception of indications during subsequent steps of the indication cycle.

In accordance with the principle as has been set forth of operating the indication relay in the office on the step following the step during which the indication code is received, the code received during the seventh step is used to control an indication relay during a time comparable to an execution period which is formed by the interval during which the relays CS and CSP are contemporaneously picked up. Thus, if the character transmitted during the seventh step is a mark, for example, the relay OM is picked up during the seventh step, and upon the picking up of relay CS in response to the passage of the oscillator pendulum through center for the last time during the first half of the cycle, a control period is initiated during which energy is applied to the channel 367 wire for the seventh step. With reference to Fig. 1A, the relay CS is picked up at this time by the energization of a circuit extending from (+), including contact fingers 41 and 45 of oscillator CT, back contact 98 of relay 1V, back contact 103 of relay 3V, back contact 220 of relay 2V, and upper winding of relay CS, to (−). With the relay CSP picked up at this time, the relay CS is maintained energized by an obvious stick circuit closed at front contact 364 of relay CSP.

With reference to Fig. 1C, the picking up of relay CS closes a circuit extending to the channel wire 367 for the seventh step, from which an indication magnetic stick relay (not shown) may be energized. If the relay OM is picked up at this time, energy is applied to the wire 367 through front contact 350 of relay OM, front contact 416 of relay CPP, front contact 417 of relay CS, front contact 418 of relay CSP, and front contact 368 of relay CP. If the seventh step has been a space rather than a mark, energy is applied to wire 367 in the same manner except it is applied through back contact 350 of relay OM, and is of opposite polarity.

Relay CS, in picking up at the mid-point in the indication cycle, causes the energization of the stepping relays simultaneously by a mode of operation comparable to that which has been described as being effective at the end of a control cycle.

In accordance with the momentary closure of the line circuit by the transmitting field station at the mid-point in the indication cycle as has been heretofore described, the line relay L at the control office is picked up for a period of time as is indicated in the sequence chart of Fig 7A, and the picking up of the line relay L causes the dropping away of relay CSP by removing energy at back contact 222, the back contact 96 of relay CS being open at this time, and the stepping relays being picked up so as to open back contact 221 of relay 4V.

The dropping away of relay CSP is only for a short interval as is indicated in Fig. 7A, and the dropping away of relay CSP is effective to cause the dropping away of the relay CP (see Fig. 1C). The stick circuit for relay CP is opened at front contact 324 by the dropping away of relay CSP, and the pickup circuit for the relay CP is open at this time at back contact 254 of relay CS. It will be noted, however, that prior to the dropping away of the relay CP, relay CPP has a pickup circuit closed through front contact 369 of relay CS and front contact 370 of relay CP. Thus the relay CPP is picked up to select a second group of seven indication receiving channel wires for connection to the channels for the respective seven steps for the last half of the indication cycle. As the system enters the second half of the indication cycle the relay CS at the control office is dropped away upon the opening of the line circuit at the field station, and the relay CS when dropped away closes a stick circuit for the lower winding of relay CPP through back contact 369 and front contact 370*a* so as to maintain the relay CPP picked up for the last half of the indication cycle. The dropping away of the line relay L at this time is also effective to cause the picking up of relay CSP (see Fig. 1A) by the closure of back contact 222 according to the normal procedure at the beginning of a cycle of operation of the communication system. With the oscillator CT having been initiated at the control office in accordance with the dropping away of the line relay L, the stepping is initiated for the second half of the indication cycle, and the reception of indications communicated during the respective steps of the second half of the indication cycle is by a mode of operation comparable to that which has been specifically considered for the mode of operation during the first half of the indication cycle.

*Termination of indication cycle*

When the pendulum of the oscillator CT1 at the field station rotates through center for the last time during the second half of the indication cycle, relays LC1 and LCS1 are deenergized, and energy is applied to the relay CS1 to cause the picking up of that relay for effecting the restoration of the stepping relays to their energized positions. The relays LCS1 and LC1 are dropped away because of the opening of their stick circuits by the opening of contact fingers 44 and 48 of the oscillator CT1 (see Fig. 1B). This stick circuit which is last energized for holding these relays up extends from (+), including contact fingers 44 and 48 of oscillator CT1, back contact 371 of relay 2V1, back contact 372 of relay 4V1, wire 373, front contact 374 of relay LCS1, winding of relay LCS1, front contact 259 of relay 1LC1, and upper winding of relay 1LC1, to (−). Other stick circuits for the relay LCS1 which are provided for holding this relay and a relay LC1 energized at different times during an indication cycle are open at this time. One of these stick circuits includes in series back contacts 401 and 402 of relays CSP1 and L1, respectively. Another stick circuit for the relay LCS1 which is open at this time is the circuit including back contact 403 of relay CS1, and front contact 404 of relay CP1. This circuit is open because the relay CS1 is picked up at this time. Because of the relay CP1 being picked up at this time, another stick circuit, wherein energy can be applied from front contact 405 of relay CS1 or back contact 406 of relay 2V1 or back contact 407 of relay 4V1, through back contact 404 of relay CP1, is open at this time.

Relay CS1 (see Fig. 1B) becomes energized upon the closure of the contact fingers 41 and 45 of oscillator CT1 for the last time during the cycle by the energization of a circuit extending from (+), including contact fingers 41 and 45 of oscillator CT1, back contact 186 of relay 1V1, back contact 187 of relay 3V1, back contact 166 of relay 2V1, and upper winding of relay CS1, to (−).

The circuit by which the relay C1 may have been energized for the last half of the indication cycle, provided that the last character transmitted was a mark, is opened by the opening of the same contact fingers 46 and 47 of oscillator CT1 which causes the dropping away of the relays LCS1 and LC1. Thus the relay C1 in dropping away opens the line circuit at front contact 92 to terminate the last mark of the indication cycle, and the line relays at the field and at the control office are dropped away.

In accordance with the picking up of relay CS1, energization circuits comparable to circuits which have been described are closed for the respective stepping relays 1V1, 2V1, 3V1, and 4V1, and when these relays are picked up, the relay C1 becomes energized to close the line circuit at front contact 92 (see Fig. 1B). Relay C1 (see Fig. 1D) is picked up at this time through front contact 408 of relay 2V1, and when picked up is maintained energized through its stick contact 409.

Upon the picking up of the line relay L1 at the end of the indication cycle, relay CSP1 is deenergized by the opening of a stick circuit for this relay including back contact 174 of relay L1. The dropping away of relay CSP1 completes restoration of the code communication apparatus at the field station to its normally at rest condition at the end of an indication cycle of operation.

To consider the termination of an indication cycle at the control office, the rotation of the pendulum of the oscillator CT through center for the last time causes the picking up of relay CS by the energization of a circuit comparable to that which has been described for the energization of relay CS1 at the field station under similar circumstances, and the picking up of relay CS is effective to cause the picking up of the stepping relays 1V, 2V, 3V, and 4V in a manner which has been heretofore described.

The line circuit becomes energized upon its closure at the field station as has been described, and because of the relay CS being in its picked up position at this time to close front contact 91, the line relay L at the control office is picked up at substantially the same time as the line relay L1 at the field station.

Relay L when picked up at the control office deenergizes the relay CSP because the relays CS and 4V have been picked up prior to this time to open back contacts 96 and 221, respectively, in the circuit for relay CSP. The relay CSP is thus dropped away because of the opening of back contact 222 of relay L at the end of the indication cycle, and the dropping away of this relay terminates the indication cycle of operation under consideration.

*Successive cycles*

In the systems of this nature where the same communication apparatus is used for code communication of controls and indications, it is necessary that an interlock be provided between the two transmitters so that it is definitely predetermined that a particular one of the transmitters will be permitted to prevail over the other transmitter for the remainder of the cycle of operation of the code communication system. Inasmuch as the transmission of indications is automatic in accordance with the change in the condition of a device to be indicated, there may be several indication cycle starts stored at once, and thus if the indication transmitter were given preference over the control office transmitter, there could be a substantial delay in the code communication of a control that has been manually designated. It is therefore provided that in case of office and field stored starts, which are stored while the system is in operation, the control office transmitter is made superior to the field transmitter so that the transmission of the designated control can be rendered effective immediately, or if the system is in operation, effective for the next communication cycle of operation of the system.

The condition of making the control office superior to the field station under the above conditions is aside from the consideration of simultaneous starts, because under conditions where stored starts exist when the system is in operation, the control office equipment is so organized relative to the field station equipment as to permit the picking up of the relay LCS at the control office for the start of a control cycle soon enough near the end of a cycle of operation which is in progress to prevent a start being made from the field station for the transmission of indications. In other words, if the control office and field station both have stored starts for control and indication cycles respectively when a cycle of operation of the communication system is in progress, the control office is able to start the next cycle by picking up its relay LCS, and the picking up of relay LCS at the control office prevents the picking up of relay LCS1 at the field station by the opening of the line circuit before the relay LCS1 at the field station has had time to be picked up. Thus the field station cannot start a second indication cycle until the respective control cycles for all control office stored starts have been completed.

This condition is readily apparent with reference to the sequence charts of Figs. 6B and 7B. According to these charts, both control office and field station starts are indicated as being designated while an indication cycle is in progress. Relay LCS at the control office is permitted to be picked up upon the dropping away of relay CSP to close back contact 71 (see Fig. 1A), and the picking up of relay LCS causes the dropping away of relay C by the opening of its stick circuit at back contact 65, which in turn opens the line circuit at front contact 90 and effects the dropping away of the line relays C and C1 at the control office and field station respectively.

With the line relay L1 dropped away at the field station, the pickup circuit for relay LCS1 (see Fig. 1D) is open at front contact 249. Prior to that time relay LCS1 could not be picked up because another relay LC1 (assuming an indication cycle to have been transmitted) could not be picked up until the dropping away of relay CSP1 to close back contact 244. After closure of this contact, the combined pickup times of a relay LC1 and relay LCS1 is such that there is time for deenergization of the line circuit and the dropping away of relay L1, as has been described, before the relay LCS1 can have a chance to be picked up to initiate an indication cycle. Although the relay LCS1 is a conventional quick-acting relay, it actually has slow pickup characteristics because of being required to be picked up in series with the stick winding of a relay LC1. Thus there is adequate time margin under the above described conditions to prevent the relay LCS1 from being picked up at this time. Relay CS1 immediately becomes dropped away upon the dropping away of the line relay L1 by the opening of its stick circuit at front contact 97 (see Fig. 1B), and by reason of the relay CS1 being dropped away, the relay LCS1 is prevented from being energized for the entire cycle by reason of its pickup circuit being open at front contact 248 of relay CS1 (see Fig. 1B).

It is thus provided that in case of stored office and field station starts which exist while the communication system is in operation, the next following cycle will always be a control cycle, and there will be no opportunity for the field station relay LCS1 to pick up to initiate an indication cycle simultaneously with the picking up of a corresponding relay LCS at the control office for the start of a control cycle.

*Simultaneous starts*

Simultaneous starts, in a sense herein considered, means the picking up substantially simultaneously of the relays LCS and LCS1 at the control office and field station respectively. Sequence charts illustrating simultaneous starts of this nature are shown in Figs. 8A and 8B, arranged one above the other for convenience in readily comparing the relative times of operation of the relays at the respective stations.

It has been pointed out that for the purpose of solving the simultaneous start problem in favor of the control office, the first communication channel which is set up upon the dropping away of the first of the stepping relays is reserved for this purpose; and if the control office is transmitting, a mark will always be applied to the line circuit during this communication channel as has been described when considering specifically the mode of operation upon the transmission of controls. However, if the communication system is to be used for the communication of indications, this first channel is always a space (assuming no simultaneous control office start), because of the line circuit being maintained open at this time at the control office as has been considered when considering the mode of operation upon reception of indications. The line circuit is maintained open under these conditions at the control office until the initiation of the second step during the reception of an indication cycle. It has been pointed out, however, that, for the transmission of indications, the relay C1 at the field station is picked up for the first step so as to close the line circuit as if a mark were being transmitted from the field station. It is by this mode of operation that the line circuit is conditioned in the field so that it can be energized to form a mark in case of a simultaneous control office start so as to pick up the line relay L1 at the field station and thus suppress the field station start that may be in progress. In other words, the picking up of line relay L1 at the field station during the first step of any cycle of operation of the communication system suppresses any field start that may have been made in a manner to store the start so that the system will be initiated for communication of indications when available for use; but the field start is suppressed for that cycle of operation and the receiving apparatus conditioned for the reception of control codes that are transmitted from the control office.

From the detail circuit organization that has been described with respect to code communication during the transmission of both control and indication cycles of operation, it should be readily apparent upon consideration of a typical example of simultaneous starts as to the manner in which the control office start is made superior. An example of the superiority of a control office start is illustrated in the sequence charts of Figs. 8A and 8B which illustrate the mode of operation control office and field station respectively for an assumed simultaneous start.

For an illustration of the control start initiation, it will be assumed that the relay 4CH (see Figs. 1A and 8A) is dropped away by the actuation of the associated lever 4_SML, and the relay 4LC is picked up in a manner which has been described when considering the initiation of a control cycle. The relay 4LC when picked up, causes the picking up of the relay LCS to initiate a cycle of operation of the communication system for the transmission of controls.

It is assumed according to the sequence chart of Fig. 8B that there has been a change in a device to be indicated effecting the dropping away of the relay 2CH1 (see Fig. 1D). This causes the picking up of relay 2LC1 (under the assumed conditions simultaneously with the picking up of relay LCS at the control office) by the energization of a circuit which has been described; and the relay LCS1 in picking up is effective to initiate the stepping and cause other relay operations in a mode of operation comparable to that which has been heretofore described as taking place normally for initiation of an indication cycle.

To consider more specifically the mode of operation at the control office and field station under simultaneous start conditions, the picking up of the respective relays LCS and LCS1 initiates the code oscillators CT and CT1 at the respective stations, the oscillator CT (see Fig. 1A) at the control office being initiated by the opening of back contact 75 of relay LCS, and the initiation of the oscillator CT1 (see Fig. 1B) at the field station being in accordance with the opening of back contact 251 of relay LCS1. The dropping away of relays LCS and LCS1 also causes the dropping away of the relays C and C1 at the associated station to open the line circuit, relay C (see Fig. 1A) being dropped away upon the opening of its circuit at back contact 65 of relay LCS, and the relay C1 (see Fig. 1D) being dropped away by the opening of its circuit at back contact 252 of relay LCS1. Upon removing energy from the line circuit, line relays L and L1 at the respective stations are dropped away, and such relays in dropping away cause the deenergization of the relays CS and CS1 respectively. Relay CS (see Fig. 1A) is dropped away by the opening of front contact 94 of relay L, and the relay CS1 (see Fig. 1B) is dropped away by the opening of its stick circuit at front contact 97 of relay L1.

The dropping of relay CS at the control office closed a pickup circuit for relay CSP (see Fig. 1A) at front contact 96, and this completes the conditioning of the apparatus at the control office prior to the system entering its first step. At the field station, the relay CSP1 is not picked up until after the first step is taken, and thus the dropping away of relay CS1 completes the conditioning at the field station prior to the first step.

In accordance with the oscillators CT and CT1 at the respective stations being initiated substantially simultaneously, the first stepping relays 1V and 1V1 are dropped away at substantially the same time. In addition to the relays 1V and 1V1 being dropped away at this time, the relays C and C1 at the respective stations become energized, the circuit for the energization of relay C (see Fig. 1A), including front contact 141 of relay 4V, front contact 142 of relay 2V, front contact 143 of relay LCS, contact fingers 46 and 47 of oscillator CT, lower winding of relay C, and front contact 65 of relay LCS. The circuit for the energization of relay C1 (see Fig. 1D) extends from (+), including back contact 257 of relay CP1, front contact 258 of relay 4V1, front contact 259 of relay 2V1, wire 260, front contact 164 of relay LCS1, contact fingers 46 and 47 of oscillator CT1, front contact 157 of relay LCS1, wire 261, and upper winding of relay C1, to (—). With the relay C and C1 picked up, the line circuit becomes energized, and the line relays L and L1 at the respective stations become picked up. Inasmuch as the relay LCS at the control office is maintained energized by stick circuits independent of the line relay L, this relay remains energized after the line relay L has been picked up. At the field station, however, the relay LCS1 becomes deenergized upon the picking up of the line relay L1. This is because of the opening of the stick circuit for relay LCS1 at back contact 402 of relay L1 (see Fig. 1D). The pickup circuit for relay LCS1 is open at this time because of the relay CS1 having been dropped away to open front contact 248, and presently the relay CSP1 will be picked up to open back contact 247 in the pickup circuit for relay LCS1.

The dropping away of relay LCS1 at the field station causes the picking up of relay CSP1 (see Fig. 1B). This pickup circuit extends from (+), including front contact 156 of relay L1, back contact 157 of relay LCS1, contact fingers 46 and 47 of oscillator CT1, back contact 165 of relay 1V1, front contact 166 of relay 2V1, front contact 167 of relay 4V1, back contact 168 of relay LCS1, and lower winding of relay CSP1, to (—). Relay CSP1 when picked up is maintained energized by stick circuits which have been described, including back contacts 169 and 172 connected in multiple, of the relays 1V1 and 3V1 respectively.

In accordance with the picking up of relay CSP1, the pickup circuit for relay 2LC1 (see Fig. 1D) is opened at back contact 244 of relay CSP1 so as to cause the relay 2LC1 to be dropped away. Because of the relay LCS1 being dropped away to open front contact 411 in the restoration circuits for the relays CH1, there can be no energization of the relay 2CH1 (assumed to have initiated the indication cycle) until the system has entered a period of rest from which the transmission of the indication cycle can again be initiated, and the transmission of the indications completed. Thus the apparatus at the field station has been dominated by transmission from the control office and conditioned for the reception of controls, and for normal operation upon the reception of a control cycle which is accomplished in a manner comparable to that which has been heretofore described. It will be noted that the simultaneous start of the field station and the control office transmitters does not modify the mode of operation of the apparatus at the control office over the mode of operation as if there were no simultaneous starts involved.

*Restoration to normal after power interruption*

For the mode of operation as it has been heretofore described, the various conditions of code communication have been considered as being effective subsequent to the system being in a state of rest in which several of the relays are maintained energized by stick circuits. In case of power interruption, these stick circuits become deenergized, and thus all relays assume their deenergized positions, and the deenergization of the oscillators CT causes the pendulums of such oscillators to swing free and eventually come to rest at center positions. The adjustment of the contacts of the oscillators has been described as being preferably made so that there is only a slight interval between the making and breaking of the respective right and left-hand contacts, and thus when the oscillator assumes a deenergized rest position, both the right and left sets of the oscillator contacts are open, but each set is adjusted to be on the verge of closing.

If it is now assumed that power is restored to the system at the control office, for example, the oscillator CT (see Fig. 1A) becomes energized by a circuit extending from (+), including back contact 115 of relay 4V, back contact 107 of relay 1V, back contact 108 of relay 2V, back contact 219 of relay 3V, and winding of oscillator CT, to (—). When the oscillator CT becomes energized, the contact fingers 41 and 45 become closed, and a pickup circuit is closed for the relay CS. This circuit extends from (+), including contact fingers 41 and 45 of oscillator CT, back contact 98 of relay 1V, back contact 103 of relay 3V, back contact 220 of relay 2V, and upper winding of relay CS, to (—).

It will be noted that the relay CSP is picked up immediately upon the restoration of energy to the system by direct energization through any one of several back contacts of relays that are dropped away at this time. Relay L when picked up upon the closing of the line circuit opens the circuit for relay CSP at back contact 222.

With the relays CS and CSP picked up, a pickup circuit is closed for each of the stepping relays V, corresponding to the circuit for relay 1V including front contacts 223 and 224 of relays CS and CSP, respectively.

Upon the picking up of the stepper relays, the code transmitter relay C becomes energized by a circuit which has been described including the front contacts of the stepper relays connected in series, and thus the relay C is picked up and closes front contact 90 in the line circuit. Front contact 91 of relay CS in the line circuit has already been closed, and thus the line relay L can now be picked up, and the picking up of this relay causes the dropping away of the relay CSP, which in turn opens the pickup circuits for the stepping relays so that these relays are maintained picked up entirely by their stick circuits including their upper windings which are of higher resistance.

Because of the change relays CH at the control office being of the normally energized type, their relays are dropped away upon removal of power, and therefore, inasmuch as it is the dropped away positions of these relays that initiate the system into respective cycles of operation, the system will automatically operate through a control cycle for each of the respective control stations in order to restore the change relays CH to their normally energized positions. This mode of operation is the same as has been described when considering the mode of the operation for the transmission during a typical control cycle. Thus the apparatus at the control office has been completely restored to its conditions which have been considered as normal, and which normally exist when the system is in a state of rest after power has been applied.

Having considered specifically the mode of operation at the control office for restoration to normal conditions after a power interruption, it will be readily understood that a similar mode of operation is effective for the apparatus at the field location.

Having thus described a code communication system for the control of a typical simple track layout as one embodiment of the present invention, it is desired to be understood that this form is used more particularly to facilitate an understanding of the mode of operation than to limit the scope of the present invention, and it should be readily understood that the code communication system herein disclosed is readily adaptable for use with practically any track layout which may be encountered in practice, and it is to be further understood that various alterations, adaptations, and modifications may be made to the specific system disclosed in accordance with the requirements of practice within the scope of the appending claims.

What I claim is:

1. A two-way code communication system for at times transmitting control codes from a control office station to a field station and at other times transmitting indication codes from the field station to the control office station comprising in combination, a line circuit connecting the two stations, an oscillatory timing device at each of the stations having a torsional pendulum spring biased to a center position with respect to rotation, said timing device having two distinct groups of contacts which are actuated alternately as the pendulum rotates through its center position, and said timing device having a normally energized electromagnet effective when energized to attract and retain said pendulum in a rotated position displaced from said center position, a single bank of normally energized stepping relays at each station effective to successively deenergize its relays respectively in response to the successive actuations of the respective groups of contacts of the timing device at the associated station, initiating means at each station for initiating said code communication system into a cycle of operation for transmission of a selected code from that station over the line circuit, said initiating means being effective to deenergize said timing device at each station and thereby cause operation of the respective stepping banks irrespective of which station is transmitting, code transmitting means at each of the stations effective in response to said initiating means at that station to transmit a selected code over said line circuit during the respective steps of said stepping bank, and code receiving means at each of the stations actuated only in response to code pulses transmitted over said line circuit from the other station.

2. A system for two-way code communication over a single line circuit connecting two stations comprising in combination, a line circuit connecting the two stations, said line circuit including line relays at both stations, an oscillatory timing device at each of the stations having a torsional pendulum spring biased to a center position with respect to rotation, said timing device having two groups of contacts that are alternately opened and closed at times when said pendulum rotates through said center position, and said device having a normally energized electromagnet normally holding the pendulum in a rotated position from said center position, a single bank of normally energized stepping relays at each station, initiating means at each station for initiating operation of said timing device at the associated station by deenergizing its electromagnet, said initiating means also being effective over said line circuit to initiate the timing device at the other station, circuit means at each station including said groups of contacts of said device at the associated station for selectively dropping away the relays of said stepping bank when that device is initiated, the stepping relays being dropped away one relay at a time at intervals measured by the associated device, code transmitting means at each of the stations effective in response to said initiating means and the operation of said stepping relay bank at the associated station to transmit a selected code over said line circuit, and code receiving means including said bank of stepping relays at each of the stations actuated in response to code pulses received over the line circuit from the other station.

3. A normally at rest two-way code communication system for at times transmitting selected codes from a control office station to a field station and at other times transmitting selected codes from the field station to the control office station comprising in combination, a single line circuit connecting the two stations, said line circuit including line relays at both stations, a normally inactive oscillatory timing device at each station effective when rendered active to actuate two groups of contacts to predetermined positions alternately at regular predetermined time intervals, initiating means at each of the stations for initiating operation of said timing device, said initiating means being effective over said line circuit to render active the timing device at the other station, a bank of normally energized stepping relays at each station, circuit means governing the deenergization of said stepping relays, step by step, in accordance with the actuation of the respective groups of contacts of said timing device at the associated station, code transmitting means at each station effective in response to said initiating means at that station to transmit a selected code of mark and space characters to the other station, and code receiving means at each of the stations comprising odd and even mark receiving relays, said code receiving means being effective to energize said odd mark receiving relay when said line circuit is energized during respective odd steps, and to energize said even mark receiving relay when said line circuit is energized during respective even steps.

4. A normally at rest code communication system for at times transmitting selected codes from a control office station to a field station and at other times transmitting selected codes from the field station to the control office station comprising, a single line circuit connecting the two stations, said line circuit having line relays at both stations, a normally inactive oscillatory timing device at each station effective when rendered active to actuate two separate groups of contacts alternately to predetermined positions at regular predetermined time intervals, initiating means at each of the stations for initiating operation of said timing device, said initiating means being effective over said line circuit to render active the timing device at the other station, a bank of normally energized stepping relays at each station, circuit means governing the deenergization of said stepping relays, step by step, in accordance with the actuation of the respective groups of contacts of said timing device at the associated station, the odd steps being taken in response to the actuation of one of said groups of contacts, and the even steps being taken in response to the actuation of the even groups of contacts, code transmitting means at each of the stations effective in response to said initiating means at that station to transmit a code of selected characters to the other station, the respective characters being counted by said stepping bank at the associated station, and code receiving means at each of the stations governed by the operation of said stepping bank at the associated station to decode the codes received over said line circuit from the other station.

5. A normally at rest code communication system for at times transmitting selected codes from a control office station to a field station and at other times transmitting selected codes from the field station to the control office station comprising, a single line circuit connecting the two stations, said line circuit being normally energized and having line relays at both stations, a normally inactive timing device having an oscillatory pendulum spring biased to a center position, said timing device having a normally energized electromagnet for holding said pendulum in a rotated position with respect to said center position, and said timing device having two groups of contacts actuated to predetermined positions alternately as the pendulum rotates through its center position, initiating means at each of the stations for initiating operation of said timing device by the deenergization of its electromagnet, said initiating means being effective over said line circuit to deenergize the electromagnet of the timing device at the other station and thereby cause device to be actuated, a bank of normally energized stepping relays at each station, circuit means governing the deenergization of said stepping relays, one relay at a time, in accordance with the actuation of the respective groups of contacts of said timing device at the associated station, the stepping relays for the odd steps being actuated by contacts of one of said groups, and the stepper relays for the even stepper being actuated by contacts of the other of said groups, code transmitting means at each of the stations effective in response to said initiating means to transmit a selected code over said line circuit wherein the code pulses are counted by said stepping bank, and the duration of the pulses is determined by the timing of said device, and code receiving means at each of the stations governed by the stepping bank at the associated station and distinctively responsive to the different codes received over said line circuit.

6. A normally at rest code communication system for at times transmitting selected codes from a control office station to a field station and at other times transmitting selected codes from the field station to the control office station comprising in combination, a single line circuit connecting the two stations, said line circuit being normally energized and having line relays at both stations, a normally inactive oscillatory timing device having two groups of contacts actuated thereby to predetermined positions alternately at regular predetermined time intervals, initiating means at each of the stations for initiating operation of said timing device at that station, said initiating means also being effective over said line circuit to render active the timing device at the other station, a bank of stepping relays at each station, circuit means governing the actuation of said stepping relays, one relay at a time, in accordance with the actuation of contacts alternately of the respective groups of contacts of said timing device at the associated station, the odd relays of the stepping bank being actuated by contacts of one group, and the even relays of the stepping bank being actuated by contacts of the other group, code transmitting means at each station effective in response to said initiating means at that station to transmit a selected code of characters counted by said stepping bank and timed by said timing device over the line circuit to the other station, and code receiving means at each of the stations governed by the stepping bank and the timing device at the associated station, said code receiving means at said control office station having respective odd and even code receiving relays which are distinctively conditioned in accordance with the reception of a particular character only for each of several of the respective odd and even code characters received over said line circuit from the other station, said code receiving means at said control office station also having a series of magnetic stick relays, one for each step, controlled by said odd and even code receiving relays on their respective steps.

7. In a code communication system for at times transmitting selected codes from a control office station to a field station and at other times transmitting selected codes from the field station to the control office station, a normally energized line circuit connecting the two stations, said line circuit having line relays at both stations, code transmitting and receiving apparatus at each station, said apparatus for transmitting and receiving being governed at each station by a single stepping organization comprising, a normally inactive timing device having a torsional pendulum spring biased to a center position with respect to rotation, said timing device having two contacts which are actuated to respective predetermined positions alternately as the pendulum of the timing device rotates in respective opposite directions through said center position, a bank of stepping relays, and circuit means for normally energizing said stepping relays when said timing device is inactive, said circuit means being effective when said timing device is rendered active to deenergize said stepping relays in a predetermined numerical order, one relay at a time, one odd numbered relay being deenergized each time one of said contacts of said timing device is actuated to a particular position, said circuit means being effective in response to the dropping away of at least one odd numbered stepping relay to energize the next prior odd numbered stepping relay that has been dropped away for a preceding step, said circuit means being effective in response to the dropping away of at least one even numbered stepping relay to energize the next prior even numbered stepping relay that has been dropped away for a preceding step, and circuit means rendered effective subsequent to the dropping away of the last step relay for causing the deenergization, one at a time, of the respective stepping relays that become energized for the second time during the stepping operation as a partial repeat of the stepping cycle of operation so as to form a greater number of distinctive steps than the total number of stepping relays constituting the stepping bank.

8. A two-way code communication system for at times transmitting control codes from a control office station to a field station and at other times transmitting indication codes from the field station to the control office station comprising in combination, a line circuit connecting the two stations, said line circuit including line relays at both stations, a normally inactive timer at each station effective when rendered active to actuate two groups of contacts to predetermined positions alternately at regular predetermined time intervals, initiating means at each of the stations for initiating operation of said timing devce at that station, said initiating means also being effective over said line circuit to render active the timing device at the other station, a bank of normally energized stepping relays at each station for counting the pulses respectively transmitted and received over the line circuit, and circuit means governing the energization of said stepping relays so as to deenergize them one at a time in a predetermined numerical order, one odd numbered stepping relay being deenergized each time one of said groups of contacts of said timer is actuated to a particular position, and one even numbered stepping relay being deenergized each time the other of said groups of contacts of said timer is actuated to a particular position, said circuit means being effective to restore certain of the odd and even numbered stepping relays for the first several steps, to their respective energized positions during subsequent steps, only one of said relays being actuated by energization during any one stepping period, and said circuit means permitting the deenergization of said certain relays for the second time during the stepping operation in accordance with the actuation of the associated timing device, one relay being deenergized at a time the same as at the beginning of the operation of the stepping bank as a partial repeat of the operation of the relays of the stepping bank after all stepping bank relays have been deenergized successively for the first time.

9. A code communication system for transmitting a control code from a control office station to a field station and for transmitting indication codes from the field station to the control office station comprising in combination, a line circuit connecting the two stations, an oscillatory timing device at each of the stations having a torsional pendulum spring biased to a center position with respect to rotation, said timing device having two distinctive groups of contacts which are opened alternately as the pendulum rotates through said center position, and said timing device having an electromagnet effective when energized to attract and retain said pendulum in a rotated position displaced from said center position, a normally energized bank of stepping relays at each station effective in response to the actuation of said contacts to take one step by the deenergization of one of said stepping relays each time one of said groups of contacts is opened for several successive operations of the associated timing device, initiation means at each station for causing the deenergization of the timing devices at both stations and thereby initiating said code communication system into a cycle of operation for transmission of a selected code from that station over said line circuit, said initiating means being effective by the initiation of the respective timing devices to cause operation of the respective stepping relay banks, code transmitting means at each of the stations, said code transmitting means being effective in response to the operation of said initiating means at that station to transmit a selected code over said line circuit during the respective steps of the stepping banks, said code transmitting means at the field station being effective when actuated to always close the line circuit during the first step, and said code transmitting means at the control office being effective when rendered active to always close the line circuit during the first step, and being effective when inactive to always leave the line circuit open during a cycle of operation until the second step is taken, and means at the field station for suppressing initiation of transmission at that station in response to the energization of the line circuit during the first step.

10. A normally at rest centralized traffic control system for at times communicating selected codes from a control office station to a field station and at other times communicating selected codes from the field station to the control office station, a single line circuit connecting the two stations, said line circuit having a line relay for each station, a normally inactive timing device at each station having an oscillatory pendulum spring biased to a center position with respect to rotation, said timing device having an electromagnet effective when energized to retain said pendulum in a particular rotated position with respect to said center position, initiating means at each station effective when actuated to deenergize said electromagnet of said timing device at the associated station for sufficient time to permit several free oscillations of said pendulum, said initiating means being effective over the line circuit to similarly initiate the timing device at the other station, stepping means at each station operable step-by-step in response to the operation of said timing device at the associated station, code transmitting and receiving apparatus at each of the stations governed by said stepping bank and said initiating means at the associated station, and circuit means effective over the line circuit in case of substantially simultaneous starts of said code transmitting apparatus at the respective stations for suppressing the start of the transmitting apparatus at a predetermined one of the stations.

11. In a centralized traffic control system, normally at rest code communication apparatus for at times communicating selected codes from a control office station to a field station and at other times communicating selected codes from the field station to the control office station comprising in combination, a single line circuit connecting the two stations, said line circuit having a line relay at each station, a normally inactive timing device at each station having an oscillatory torsional pendulum spring biased to a center position with respect to rotation, said timing device having an electromagnet effective when energized to retain said pendulum in a particular rotated position with respect to said center position, initiating means at each station effective when actuated to deenergize the electromagnet of the timing device at the associated station for a sufficient time to permit several free oscillations of the pendulum, said initiating means being effective over the line circuit to station, a bank of stepping relays at each station similarly initiate the timing device at the other tion operable step by step in response to the operation of said timing device at the associated station as its pendulum oscillates through said center position, one step being taken each time the pendulum passes through center, code transmitting and receiving apparatus at each of the stations, said code transmitting and receiving apparatus being governed by said stepping bank at the associated station, and circuit means effective over the line circuit during the first step taken by said stepping bank in case of substantially simultaneous starts of said code transmitting apparatus at the respective stations for suppressing the start of the transmitting apparatus at a predetermined one of said stations.

12. A normally at rest centralized traffic control system for at times communicating selected codes from a control office station to at least one field station and at other times communicating selected codes from a field station to the control office station comprising, a single line circuit connecting the stations, said line circuit having a line relay at each station, a normally inactive timing device at each station having an oscillatory torsional pendulum spring biased to a center position with respect to rotation, said timing device having an electromagnet effective when energized to retain the pendulum in a particular rotated position with respect to said center position, initiating means at each of the stations effective when actuated to deenergize said electromagnet of said timing device at that station for sufficient time to permit several free oscillations of the pendulum, said initiating means being effective over the line circuit to similarly initiate the timing device at another station, a bank of stepping relays at each station operable in response to the timing device of the associated station to take one step for each time such device has its pendulum rotated through said center position, code transmitting and receiving apparatus at each of the stations governed by said stepping bank at the associated station, and circuit means effective over the line circuit in case of simultaneous starts of said code transmitting apparatus at two stations for rendering the control office station superior and suppressing the field station transmitter and conditioning that field station for the reception of codes transmitted from the control office.

13. A centralized traffic control system having normally at rest code communication apparatus for at times communicating selected codes from a control office station to a field station and at other times communicating selected codes from the field station to the control office station, a single line circuit connecting the two stations, said line circuit having a line relay for each station, a normally inactive timing device at each station having an oscillatory pendulum spring biased to a center position with respect to rotation, said timing device having an electromagnet effective when energized to retain said pendulum in a particular rotated position with respect to said center position, initiating means at each station effective when actuated to deenergize said electromagnet of said timing device at that station for sufficient time to permit several free oscillations of said timing device, said initiating means being effective over the line circuit to similarly initiate the timing device at the other station, stepping means at each station operable step by step in response to the respective oscillations of said timing device at the associated station, code transmitting and receiving apparatus at each of the stations governed by said stepping relays and said initiating means at the associated station, and means effective over the line circuit during the first step in case of simultaneous starts of said code transmitting apparatus at the respective stations for suppressing the start of the transmitting apparatus at said field station and conditioning that field station for the reception of codes over the line circuit from the control office in accordance with the reception of a particular code character transmitted from the control office at that time.

14. In a centralized traffic control system for the communication of selected codes from a control office station to a field station and the communication of selected codes from field station to the control office station, a line circuit connecting the two stations, said line circuit having a line relay at each station, a normally inactive timing device at each station having an oscillator pendulum spring biased to a center position with respect to rotation, said timing device having an electromagnet effective when energized to retain said pendulum in a particular rotated position with respect to said center position, initiating means at each station effective when actuated to deenergize said electromagnet of said timing device at that station for sufficient time to permit several free oscillations of said timing device, said initiating means being effective over the line circuit to similarly initiate the timing device at the other station, a bank of stepping relays at each station operable step by step during the respective oscillations of said timing device at the associated station, code transmitting and receiving apparatus at each of the stations governed by said stepping bank and said initiating means at the associated station, said code transmitting means at the field station being effective to always close the line circuit during the first step, and said code receiving apparatus at the control office being effective to hold the line circuit open during the first step for the receiving of a code transmitted from the field station, and said code transmitting apparatus at the control office being effective to always close said line circuit during the first step when the control office is transmitting.

15. A centralized traffic control system having normally at rest code communication apparatus for the transmission of selected codes from a control office station to a field station and from the field station to the control office station comprising, a single line circuit connecting the two stations, said line circuit having a line relay at each station, a normally inactive timing device at each station having an oscillatory torsional pendulum spring biased to a center position with respect to rotation, said timing device having an electromagnet effective when energized to retain said pendulum in a particular rotated position with respect to said center position, initiating means at each station effective when actuated to deenergize said electromagnet of said timing device at the associated station for sufficient time to permit several free oscillations of said timing device, said initiating means being effective over the line circuit to similarly initiate the timing device at the other station, a bank of stepping relays at each station operable in response to the respective oscillations of said pendulum of the timing device at the associated station, code transmitting and receiving apparatus at each of the stations governed by said stepping bank and said initiating means at the associated station, said transmitting means at the field station being always effective to close said line circuit during the first step, and said code receiving apparatus at the control office being effective to open the line circuit during the first step provided that said code transmitting apparatus at the associated station has not been initiated, said code transmitting apparatus being effective when initiated to close said line circuit during the first step taken by said stepping bank at the associated station, and circuit means at the field station effective in response to the picking up of the line relay at the associated station during the first step to suppress the operation of said code transmitting apparatus at the associated station and condition said code receiving apparatus for the reception of codes transmitted over the line circuit from the control office.

NELSON B. COLEY.

No references cited.